(12) United States Patent
DeMent et al.

(10) Patent No.: US 7,813,490 B2
(45) Date of Patent: Oct. 12, 2010

(54) METHODS AND APPARATUS FOR IMPLEMENTING CUSTOMIZED RINGBACK

(75) Inventors: Jeffrey M. DeMent, Hoffman Estates, IL (US); Christophe Gerard, Shrewsbury, MA (US)

(73) Assignee: NMS Communications Corp., Framingham, MA (US)

( * ) Notice: Subject to any disclaimer, the term of this patent is extended or adjusted under 35 U.S.C. 154(b) by 1710 days.

(21) Appl. No.: 10/981,817

(22) Filed: Nov. 5, 2004

(65) Prior Publication Data

US 2005/0117726 A1 Jun. 2, 2005

Related U.S. Application Data

(60) Provisional application No. 60/518,818, filed on Nov. 10, 2003, provisional application No. 60/577,724, filed on Jun. 7, 2004.

(51) Int. Cl.
*H04M 7/00* (2006.01)
(52) U.S. Cl. .............. 379/221.03; 379/221.04; 379/373.02; 379/374.01; 379/380; 379/257
(58) Field of Classification Search ........... 379/257, 379/221.03, 221.04, 373.02, 374.01, 380
See application file for complete search history.

(56) References Cited

U.S. PATENT DOCUMENTS 5,440,619 A * 8/1995 Cann ............... 379/93.11
5,608,782 A * 3/1997 Carlsen et al. ........... 455/461
6,574,335 B1 * 6/2003 Kalmanek et al. ........ 379/386
6,603,844 B1 * 8/2003 Chavez et al. .......... 379/114.13
6,778,648 B1    8/2004 Alston et al. ........... 379/93.27
7,184,532 B2 * 2/2007 Creamer et al. ........ 379/207.08
7,224,788 B1 * 5/2007 Rhee et al. ............. 379/207.02
7,319,881 B2 * 1/2008 Endo .................. 455/466
2004/0120494 A1 * 6/2004 Jiang et al. ........... 379/210.01

OTHER PUBLICATIONS

International Search Report from the PCT/US04/37128 filed on Nov. 5, 2004, Total pp. 3.

* cited by examiner

*Primary Examiner*—Ahmad F Matar
*Assistant Examiner*—Antim Shah
(74) *Attorney, Agent, or Firm*—Chapin IP Law, LLC

(57) ABSTRACT

A ring-back tone generator system receives an inbound call connection request forwarded from a phone switch (such as an MSC) that receives the inbound call connection request from a caller phone attempting to connect to a target phone (e.g., a subscriber). The ring-back tone generator system initiates generation of a first call connection on which to provide the customized ring-back tone (and/or custom video image data) to the caller phone. The ring-back tone generator system also transmits, based on receiving the inbound call connection request, an outbound call connection request to the phone switch (such as the MSC) to establish a second call connection through the phone switch to the target phone. Consequently, an MSC that normally handles such call processing now relies on the ring-back tone generator system to handle call processing and provide a custom ring-back tone service.

70 Claims, 20 Drawing Sheets

METHODS AND APPARATUS FOR IMPLEMENTING CUSTOMIZED RINGBACK

RELATED APPLICATIONS

This application is related to and claims the benefit of earlier filed U.S. Provisional Patent Application Ser. No. 60/518,818, entitled "New services Based on Custom Ringback Capabilities," filed on Nov. 10, 2003, and earlier filed U.S. Provisional Patent Application Ser. No. 60/577,724, entitled "Telephony Network Integration Methods for a Customized Ringback Service," filed on Jun. 7, 2004, the entire teachings of which are incorporated herein by this reference.

BACKGROUND

During past years, several network operators around the world have introduced personalized RingBack Tone (RBT) services. Such a service enables a subscriber to choose a custom audio clip (e.g., a favorite song) to be played back to a caller phone during a ringing portion of a call, prior to the subscriber answering the call. Thus, instead of hearing a standard ring-back tone (at the caller phone) indicating that a target phone is being alerted of the incoming call connection request, the caller hears the custom audio clip selected by the subscriber.

According to one conventional application, a subscriber of the custom ring-back tone service may specify one of several audio clips to be played by a respective phone switch network based on caller identification, time-of-day, or other factors. The purpose of the audio clip can be entertainment, advertising, or corporate identification/branding.

A conventional architecture for providing custom ring-back tones includes a Mobile Switching Center (MSC), a Home Location Register (HLR), and a ring-back tone generator. In this architecture, software in a network operator's MSC, in conjunction with the Home Location Register (HLR), identifies which received calls have been placed to corresponding subscribers of the ring-back service. For such calls, the MSC sets up a voice path to the ring-back tone generator for conveying a ring-back tone to the caller phone while also placing an outbound call connection to alert the subscriber of the call placed by the caller phone. The ring-back tone generator then plays the selected audio clip back to the caller through the voice path while the subscriber phone is alerted of the incoming call connection request. When the MSC detects that the subscriber answers his alerting phone, or the target phone abandons the call, the MSC releases the voice path to the ring-back tone generator and continues on with normal call handling. For example, after detecting that the subscriber answers his phone, the MSC breaks a link to the ring-back tone generator and bridges the caller phone to the subscriber phone via a voice communication channel so that the subscriber and the caller can talk with each other without the custom ring-back tone being played.

SUMMARY

The description below describes several different examples of supporting custom ring-back tone services that may have one or more of the following advantages. For example, a network operator to advantageously can deploy such a service using existing network equipment (e.g., switches/MSCs and HLRs), even if that equipment is designed to play back the standard network ring-back tone to the caller—not a subscriber-customized audio clip. Some examples advantageously do not require the network operator to purchase expensive (and possibly service-disrupting) custom software enhancements and/or software feature package upgrades from an equipment vendor, even if an operator employs equipment from multiple vendors in their network. In such examples, the network operator does not have to acquire software supporting a custom ring-back tone service from the equipment vendor, who might not have such software available.

In one example, there is an MSC that redirects handing of a call connection request to a remotely located ring-back tone generator system. During operation, the ring-back tone generator system maintains a first link through the MSC to feed back a custom ring-back tone to a caller phone calling a target phone. The ring-back tone generator system also maintains a second link through the MSC to alert (e.g., cause the subscriber's phone to ring) a subscriber phone of an incoming call request. Upon detection of a subscriber answering his phone, the ring-back tone generator system i) discontinues providing the ring-back tone to the caller phone and ii) bridges the first link and second link so that the caller phone can communicate with the subscriber phone. To free resources of the ring-back tone generator system after connecting the caller phone to the subscriber phone, the ring-back tone generator system optionally instructs the MSC to bridge the first and second link in lieu of having to provide the bridge at the ring-back tone generator system. Freed resources of the ring-back tone generator system then can be used to handle new calls.

Another example configuration includes a service control system (external to the MSC) that provides call-processing instructions based on trigger conditions. This configuration alleviates the MSC from handling call processing as in conventional custom ring-back tone service applications.

Both of the above example configurations enable a network operator to deploy a custom ring-back tone service without having to purchase expensive customized software or feature upgrade packages for an MSC. Instead, an operator can simply reconfigure an existing network to include a new ring-back tone generator system or service control system as discussed above and as will be discussed in more detail below.

Accordingly, one technique herein is directed to ring-back tone service based on a service node approach. For example, a ring-back tone generator system receives an inbound call connection request forwarded from a phone switch (such as an MSC) that itself receives the inbound call connection request from a caller phone attempting to connect to a target phone (e.g., a subscriber). The ring-back tone generator system initiates generation of a first call connection on which to provide the customized ring-back tone (and/or custom video image data) to the caller phone. The ring-back tone generator system transmits, based on receiving the inbound call connection request, an outbound call connection request to the phone switch (such as to the MSC) to establish a second call connection through the phone switch to the target phone. Consequently, an MSC in a conventional ring-back tone generator system that normally handles such call processing redirects a call connection request from the caller phone and relies on the ring-back tone generator system to handle call processing and provide a custom ring-back tone service.

In further configurations, the ring-back tone generator system provides a flag associated with the outbound call connection request from the ring-back tone generator to differentiate the outbound call connection request from the inbound call connection request. Thus, a phone switch system that utilizes a map or table to identify which received call connection requests to redirect to the ring-back tone generator system will not redirect the received outbound call connection request back to the ring-back tone generator system in an endless loop when the inbound call and the outbound call pertain to the same target phone.

In one configuration, the ring-back tone generator system maintains the first call connection to include a first trunk of the ring-back tone generator system and the second call connection to include a second trunk of the ring-back tone generator system. The ring-back tone generator system, therefore, has the ability to receive calls and place calls on different trunks via respective call connection legs.

The ring-back tone generator system communicates with the phone switch (from which the ring-back tone generator system receives the inbound call request message) to establish the second call connection through the phone switch. Consequently, in one configuration, both the first call connection and the second call connection terminate at the ring-back tone generator system and pass through a common phone switch system.

At least initially, the ring-back tone generator system utilizes the second call connection or related communication path through the phone switch to at least attempt to alert the target phone of an incoming call from the caller phone. For example, while maintaining the first call connection with the caller phone to eventually provide a custom ring-back tone, the ring-back tone generator system initiates the second call connection through the phone switch to alert the target phone (e.g., the subscriber) of the call connection request by the caller phone.

Depending on the configuration, the ring-back tone generator system monitors either or both in-band audio signals (e.g., audio signals transmitted on a call connection) and out-of-band signaling messages (e.g., messages associated with a call connection but not transmitted over the call connection) to determine how to handle further call processing. For example, in one configuration, the ring-back tone generator system monitors out-of-band signaling messages associated with the second call connection to i) identify whether the target phone is being alerted of an attempt by the caller phone to connect to the target phone and ii) detect termination of a mode of alerting the target phone of an attempt by the caller phone to connect to the target phone. In another configuration, the ring-back tone generator system monitors in-band audio signals on the second call connection between the ring-back tone generator system and the target phone to i) identify whether the target phone is being alerted of an attempt by the caller phone to connect to the target phone and ii) detect termination of a mode of alerting the target phone of an attempt by the caller phone to connect to the target phone. The ring-back tone generator system can monitor the in-band and out-of-band to detect other conditions as well such as when an attempted call terminates in voice-mail.

Based on the above-mentioned monitoring, when the ring-back tone generator system receives an indication from the phone switch that the target phone is being alerted (e.g., initiation of ringing the target phone) of an attempt by the caller phone to connect to the target phone, the ring-back tone generator system provides (e.g., transmits) one of multiple custom ring-back tones over the first call connection to the caller phone in lieu of a standard ring-back tone. The ring-back tone generator system determines which ring-back tone to play back on the first call connection to the caller phone depending on an identifier (e.g., phone number) associated with the caller phone and potentially an identifier (e.g., phone number of the subscriber phone) of the target phone being called.

As mentioned, in one configuration, the ring-back tone generator system simultaneously monitors out-of-band signaling messages associated with the second call connection and in-band audio signals on the second call connection to identify whether the target phone is being alerted of an attempt by the caller phone to connect to the target phone. This approach can provide better call processing results because the ring-back tone generator system can more quickly and definitively detect that the target phone is being alerted and provide a custom ring-back tone from the ring-back tone generator system over the first call connection to the caller phone.

In certain circumstances, the ring-back tone generator system receives an indication from the phone switch that the target phone cannot be alerted of an attempt by the caller phone to connect to the target phone because a subscriber shut off his phone or the subscriber is currently using his phone and does not have call waiting. In response to such circumstances, the ring-back tone generator system immediately bridges the two call connections together in lieu of providing a custom ring-back tone to the caller phone. Consequently, the caller associated with the caller receives a standard network provided tone (e.g., busy signal) or network announcement that identifies the reason for the failed call attempt in lieu of a custom ring-back tone. Otherwise providing the custom ring-back tone in this case may erroneously imply to the user that the call was being placed to the target phone but the subscriber just wasn't answering his phone. Thus, the ring-back tone generator system allows the caller phone to receive the standard network tone or announcement instead of a custom ring-back tone. In the alternative, according to one configuration, the ring-back tone generator system plays back a custom busy signal to the caller phone depending on the caller.

In one configuration, while providing a custom ring-back tone to the caller phone over the first call connection, the ring-back tone generator system monitors the first call connection for audio signals generated by a user of the caller phone. In response to detecting a presence of a particular audio signal based on an applied voice recognition algorithm, the ring-back tone generator system initiates a corresponding phone function associated with the particular audio signal. Thus, a user of the caller phone, while receiving the custom ring-back tone from the ring-back tone generator system, can speak the words "call Jim" to automatically initiate another call connection leg to Jim. For example, in this case, the ring-back tone generator system initiates call processing to include Jim in a three way call via a third call connection from the ring-back tone generator system to Jim's phone. Thus, a three-way call can include Jim (via Jim's phone), the caller (via the caller phone), and the subscriber (via the target phone). In one configuration, the ring-back tone generator system provides a voice menu of possible voice activation options to the caller phone during a ring-back tone.

While providing a custom ring-back tone, the ring-back tone generator system monitors for a trigger condition (e.g., a presence of an in-band audio signal on the second call connection or out-of-band messaging signals) indicating that the target phone is no longer being alerted of an attempt by the caller phone to connect to the target phone. In response to detecting the trigger condition, the ring-back tone generator system provides a bridge at the ring-back tone generator system between the first call connection and the second call connection to connect the caller phone to the target phone. Consequently, the ring-back tone generator system enables a user of the caller phone to speak with a subscriber of the target phone without further playing the custom ring-back tone to the caller phone.

In one configuration, a subscriber can select whether to have the ring-back tone generator system play a custom audio clip (potentially different or the same as the custom ring-back tone) during a phone conversation. Thus, the ring-back tone generator system is not limited to generating custom audio during an "alert" portion of a phone call. If the subscriber selects an audio clip to play in the background during a phone conversation, the ring-back tone generator system continues to or starts to provide an appropriate customized audio (e.g., music) over the first call connection and the second call connection during an active session including communications when a user of the caller phone is able to speak with a user of the target phone.

It is possible that a subscriber has initiated call forwarding for phone calls to his target phone. The ring-back tone generator system monitors for a trigger condition indicating a forwarding of the second call connection to an alternative destination instead of the target phone. In response to detecting the trigger condition, the ring-back tone generator system provides a bridge at the ring-back tone generator system between the caller phone and the alternative destination (e.g., another phone device, voice mail, etc.). In one configuration, the ring-back tone generator system utilizes an identifier (e.g., phone number) associated with the alternative destination to determine whether provide a different custom ring-back tone to the caller phone based on being forwarded to the alternative destination. If so, the ring-back tone generator system provides a custom ring-back tone associated with the alternative destination (and caller phone) over the first call connection to the caller phone.

As previously discussed, the ring-back tone generator system optionally provides a bridge between the first call connection and the call second connection to couple the caller phone to the subscriber phone. In one configuration, the ring-back tone generator system passes off a duty of bridging the first call connection and the second call connection to a phone switch in the path of the first call connection and second call connection to free up resources (e.g., phone trunks) of the ring-back tone generator system. For example, in such an configuration, the ring-back tone generator system transmits a message from the ring-back tone generator system to the phone switch to initiate establishing a bridge at the phone switch to connect the caller phone and the target phone in lieu of the bridge in the ring-back tone generator system. As discussed, the first call connection and second call connection pass through the phone switch that initially redirected the call connection request to the ring-back tone generator system.

The phone switch may or may not be able to handle this call processing request of providing a bridge. If not, the ring-back tone generator system receives notification from the phone switch of an inability of the phone switch to provide the bridge between the caller phone and the target phone in lieu of coupling the caller phone to the target phone at the ring-back tone generator system. In such a case, the ring-back tone generator system can continue to bridge the first call connection and the second call connection so that the caller phone can communicate with the target phone. That is, in response to receiving the notification, the ring-back tone generator system provides a new bridge or continues to provide an existing bridge in the ring-back tone generator system between the first call connection and the second call connection to connect the caller phone to the target phone.

Another configuration includes technique of supporting custom ring-back tones from the perspective of a phone switch system. For example, a phone switch system such as an MSC receives a call connection request originating from a caller phone to establish a call connection between the caller phone and a target phone. The phone switch identifies that the target phone is associated with a subscriber of a custom ring-back tone service and thereafter redirects the call connection request originating from the caller phone to a ring-back tone generator system that provides a customized ring-back tone service. After redirecting the call connection request, the phone switch receives a call connection request from the ring-back tone generator system to establish a call connection between the ring-back tone generator system and the target phone.

In one configuration, the phone switch utilizes an unconditional call forwarding to redirect the call connection request. For example, the phone switch system generates an unconditional call forwarding message based on a first number identifier associated with the target phone to forward the call connection request to the ring-back tone generator system instead of directly placing an outgoing call to the target phone itself. In one configuration, the call connection request received from the ring-back tone generator system includes a second number identifier associated with the target phone. The phone switch system identifies (based on use of the second number) that the call connection request should not be redirected to the ring-back tone generator system and utilizes the second number to place a call to the target phone. As discussed above, use of two different numbers for the same target phone enables the phone switch system and the ring-back tone generator system to avoid an endless loop of transmitting the call connection request between the phone switch and the ring-back tone generator system.

In another configuration, the phone switch system receives a flag associated with the call connection request from the ring-back tone generator to differentiate how to handle call processing. The flag provides an indication to the phone switch system to perform standard call routing in lieu of redirecting the call connection request from the ring-back tone generator system back to the ring-back tone generator system. Thus, a call connection request can be based on the same identifier (e.g., phone number of the target phone) without causing the call connection request from being passed in an endless loop between the phone switch system and the ring-back tone generator system.

The phone switch system maintains at least part of a first communication path between the caller phone and the ring-back tone generator system to convey the customized ring-back tone service from the ring-back tone generator system to the caller phone. Additionally, the phone switch system maintains at least part of a second communication path from the ring-back tone generator system to the target phone. The ring-back tone generator system utilizes the second communication path through the phone switch system to alert the target phone of an attempt by the caller phone to connect to the target phone.

In response to receiving the call connection request from the ring-back tone generator system, the phone switch system transmits or forwards an alert to the target phone of an attempt by the ring-back tone generator system to establish the call connection between the ring-back tone generator system and the target phone. In the event that the phone switch system detects that target phone is unable to receive a call alert initiated by the ring-back tone generator system, the phone switch system provides notification to the ring-back tone generator system that the target phone is unable to receive the call. In one configuration, this notification prompts the ring-back tone generator system to bridge the two call connections together within the ring-back tone generator system, allowing the caller to hear the standard network tone or announcement identifying the reason for the call failure (instead of a custom ring-back tone).

As previously discussed for one configuration, the ring-back tone generator system eventually attempts to hand off bridging of the first call connection and second call connection terminating at the ring-back tone generator system and passing through the phone switch system. In such a case, the phone switch system receives a message from the ring-back tone generator system to provide a bridge between the caller phone and the target phone in lieu of coupling the caller phone to the target phone at the ring-back tone generator system.

The phone switch system may or may not be able to provide the bridge enabling the ring-back tone generator system to free up some of its resources. If not, the phone switch system notifies the ring-back tone generator system of an inability to provide the bridge between the caller phone and the target phone in lieu of coupling the caller phone to the target phone at the ring-back tone generator system. If so, the phone switch system notifies the ring-back tone generator system that the phone switch system can accommodate the handoff request and provide a bridge to connect the caller phone and target phone.

As discussed, techniques herein are well suited for use in applications providing customized ring-back tone services. However, it should be noted that configurations herein are not limited to use in such applications and thus configurations herein and deviations thereof are well suited for other applications as well.

Other configurations include a computerized device (e.g., a host computer, workstation, etc.) configured to support the aforementioned method operations disclosed herein as configurations to provide or support customized ring-back tone services. In such configurations, the computerized device includes a memory system, a network/communication interface, a processor (e.g., a processing device), an optional display, and an interconnect. The interconnect supports communications among the processor, the memory system and the optional display. The network/communication interface supports communication with remote devices with respect to the computer. The memory system is encoded with an application that, when executed on the processor, produces a process that supports custom ring-back tone services.

Yet other configurations disclosed herein include software programs to perform the method configuration and operations summarized above and disclosed in detail below under the heading Detailed Description. More particularly, a computer program product (e.g., a computer-readable medium) including computer program logic encoded thereon may be executed on a computerized device to support techniques as explained herein. That is, the computer program logic, when executed on at least one processor with a computing system, causes the processor to perform the operations (e.g., the methods) indicated herein. Such arrangements are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular configuration is directed to a computer program product that includes a computer readable medium having instructions stored thereon for supporting custom ring tone services. The instructions, when carried out by a processor of a respective computer device, cause the processor to perform the steps of: i) receiving an inbound call connection request forwarded from a phone switch that receives the inbound call connection request from a caller phone attempting to connect to a target phone; ii) initiating generation of a first call connection on which to provide the customized ring-back tone to the caller phone; and iii) transmitting an outbound call connection request to the phone switch to establish a second call connection through the phone switch to the target phone. Other configurations include software programs to perform any of the method configuration steps and operations summarized above and disclosed in detail below.

BRIEF DESCRIPTION OF THE DRAWINGS

The foregoing and other objects, features, and advantages of the presented techniques herein will be apparent from the following more particular description of preferred configurations, as illustrated in the accompanying drawings in which like reference characters refer to the same parts throughout the different views. The drawings are not necessarily to scale, with emphasis instead being placed upon illustrating embodiments, techniques, and concepts herein.

DETAILED DESCRIPTION

In contrast to conventional approaches discussed above, techniques herein are directed toward novel ways of supporting custom ring-back tone services. For example, one configuration herein involves use of an MSC (Mobile Switching Center) that redirects handing of a call connection request to a remotely located and independently operating ring-back tone generator system. During operation, the ring-back tone generator system maintains a first link through the MSC to feed back a custom ring-back tone to a caller phone calling a target phone. The ring-back tone generator system also maintains a second link through the MSC to alert (e.g., cause the subscriber's phone to ring) a subscriber phone of an incoming call request. Upon detection of a subscriber answering his phone, the ring-back tone generator system i) discontinues providing the feedback to the caller phone and ii) bridges the first link and second link so that the caller phone can communicate with the subscriber phone. To free resources of the ring-back tone generator system after connecting the caller phone to the subscriber phone, the ring-back tone generator system optionally instructs the MSC to bridge the first and second link in lieu of having to provide the bridge at the ring-back tone generator system. Freed resources of the ring-back tone generator system therefore can be used to handle new calls.

Another technique herein includes a service control system (external to the MSC) that provides call-processing instructions based on trigger conditions. This configuration alleviates the MSC from handling call processing as in conventional custom ring-back tone service applications.

Both of the above configurations enable a network operator to deploy a custom ring-back tone service without having to purchase expensive customized software or feature upgrade packages for an MSC. Instead, an operator can simply reconfigure an existing network to include a new ring-back tone generator system or service control system as discussed above and as will be discussed in more detail below.

Figure 1:
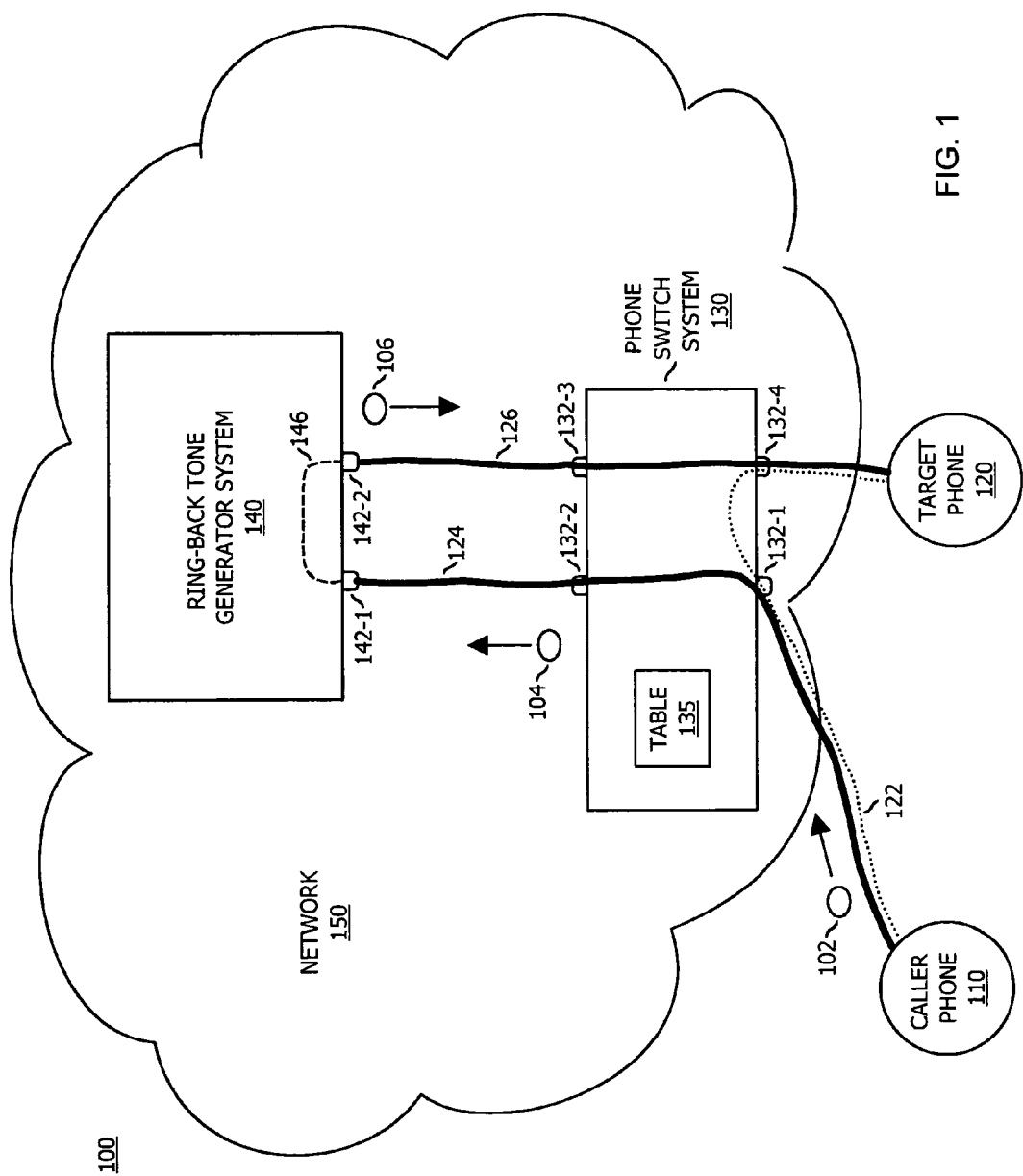
FIG. 1 is a block diagram of an example communications system suitable for use in explaining custom ring-back tone generation.

FIG. 1 illustrates a communication system 100 suitable for use in explaining an operation of example configurations herein. As shown, the communication system 100 includes a caller phone 110 and a target phone 120 in communication with network 150. Network 150 includes phone switch system 130 and ring-back tone generator system 140. Phone switch system 130 includes table 135 as well as trunk 132-1, trunk 132-2, trunk 132-3, and trunk 132-4 (collectively trunks 132). Ring-back tone generator system 140 includes trunk 142-1 and trunk 142-2 (collectively trunks 142). Call connection 124 and call connection 126 define a communication path through respective elements of network 150.

Communication system 100 supports custom ring-back tones for calls to certain subscribers of such a phone plan. For example, the custom ring-back tone service provided by communication system 100 enables a subscriber to choose a custom audio clip (e.g., a favorite song) to be played back to a caller phone during a ringing portion of a call, prior to the subscriber answering an attempted call. Thus, instead of hearing a standard ring-back tone (at the caller phone 110) indicating that a target phone 120 is being alerted of the incoming call connection request, the caller phone 110 hears the custom audio clip (e.g., a song) selected by the subscriber.

During general operation, caller phone 110 initiates a call to target phone 120 (such as a subscriber of the custom ring-back tone service) by transmitting a call connection request 102 to phone switch system 130 such as a MSC. In one configuration, call connection request 102 includes an identifier of the caller phone 110 as well as an identifier of the target phone 120. The phone switch system 130 first compares information such as the identifier of the called party in the call connection request 102 to the table 135 (e.g., a map) to identify whether the called party (e.g., target phone 120) is a subscriber of an enhanced service requiring interaction with an external peripheral such as the ring-back tone generator system. If so, the phone switch system 130 forwards (e.g., hands off) the call connection request 104 to ring-back tone generator system 140 for further call processing to the ring-back tone generator system 140. If not, the phone switch system 130 proceeds with normal call handling routines to provide a call connection 122 between the caller phone 110 and the target phone 120.

For the case when phone switch system 130 redirects the call connection request 102 to ring-back tone generator system 140, the phone switch system 130 forwards call connection request 104 to ring-back tone generator system 140 indicating the request by caller phone 110 to connect to target phone 130. In response to receiving call connection request 104, ring-back tone generator system 140 transmits a call connection request 106 to phone switch system 130 to establish call connection path 126. Establishing call connection path 126 includes assigning a trunk 142-1 of ring-back tone generator system 140 and trunk 132-3 and trunk 132-4 of phone switch system 130 to support communications between the ring-back tone generator system 140 and the target phone 130. Call connection path 124 supports communications through trunk 142-1 of ring-back tone generator system 140 and through trunk 132-2 and trunk 132-1 to caller phone 110. While alerting the target phone 120 (e.g., causing the target phone 120 to ring) of the incoming call by caller phone 110, the ring-back tone generator system 140 provides a custom ring-back tone to caller phone 110. When a subscriber of the target phone 120 answers the target phone 120, the ring-back tone generator system 140 discontinues the ring-back tone on call connection path 124 to caller phone 110 and potentially bridges call connection path 122 (e.g. a first voice communication channel) and call connection path 126 (e.g., a second voice communication channel) via bridge 146 so that a user of caller phone 110 and subscriber of target phone 120 can speak with each other.

Figure 2:
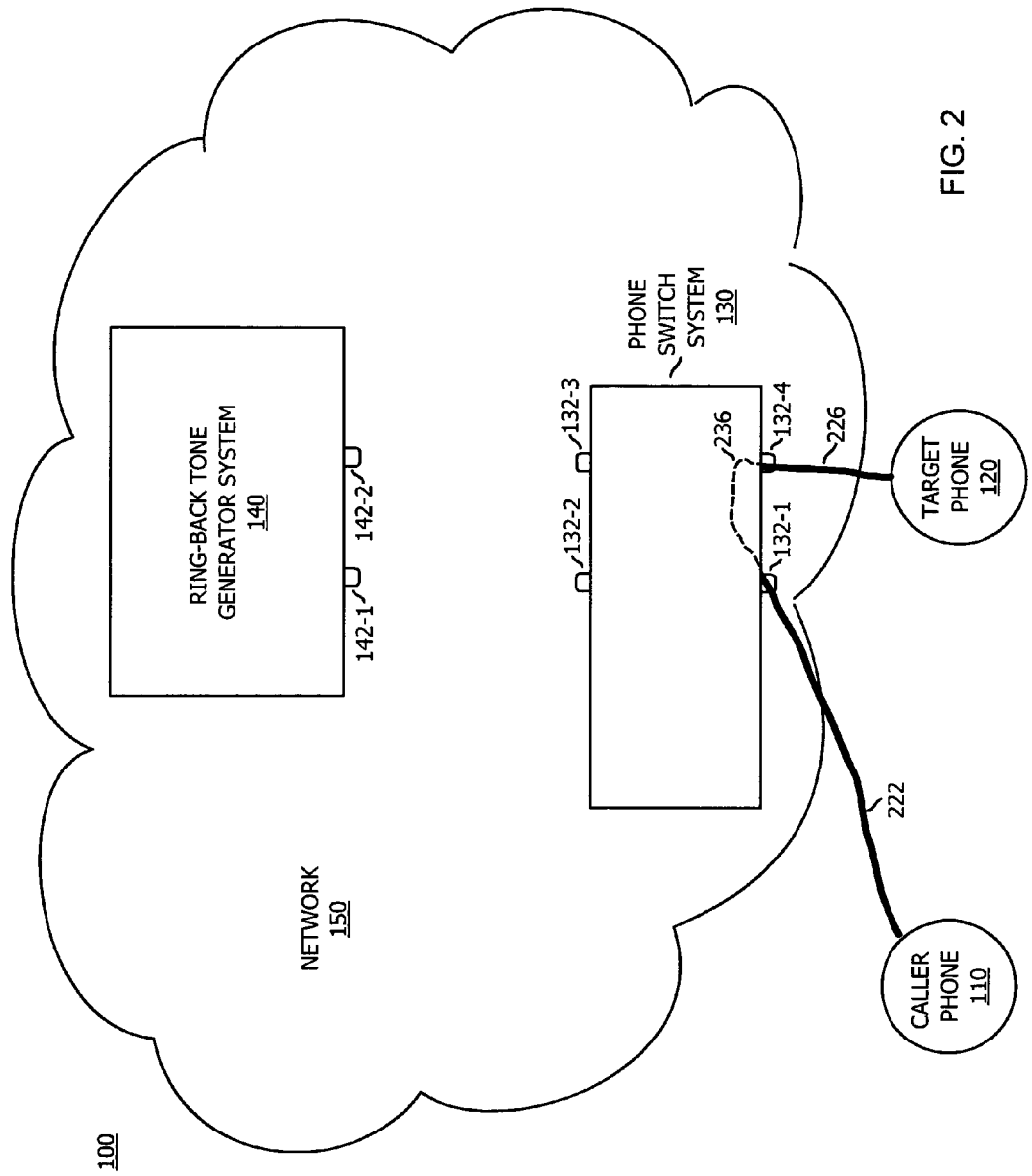
FIG. 2 is an example block diagram of the same communications system as in FIG. 1 with a connection for call bridging.

In one configuration, after providing bridge 146 to connect the caller phone 110 to the target phone 120, the ring-back tone generator system 140 transmits a message to phone switch system 130 requesting the phone switch system 130 to provide a bridge between trunk 132-1 and trunk 132-4. In response, the phone switch system 130 provides bridge 236 as shown in FIG. 2 to free trunk 142-1, trunk 142-2, trunk 132-2, and trunk 132-3. Caller phone 110 couples to target phone 120 via call connection path 222 and call connection path 226.

Functionality supported by an example configuration of ring-back tone generator system 140 will now be discussed via use of flowchart 300 in FIGS. 3-5. Note that there will be some overlap with respect to concepts discussed above for FIGS. 1 and 2.

Figure 3:
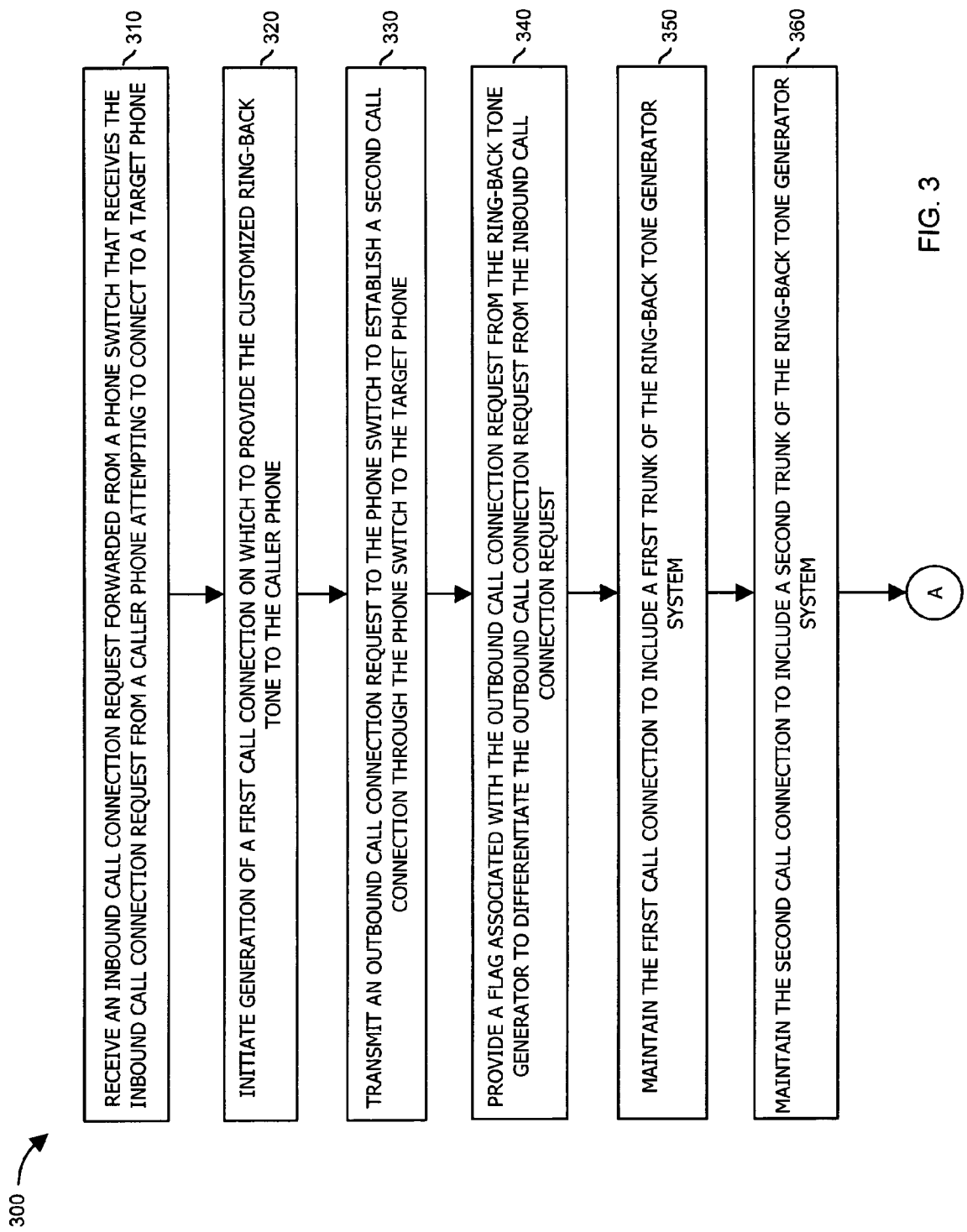
FIGS. 3-5 combine to form a flowchart illustrating example processing steps performed by a ring-back tone generator system.
Figure 4:
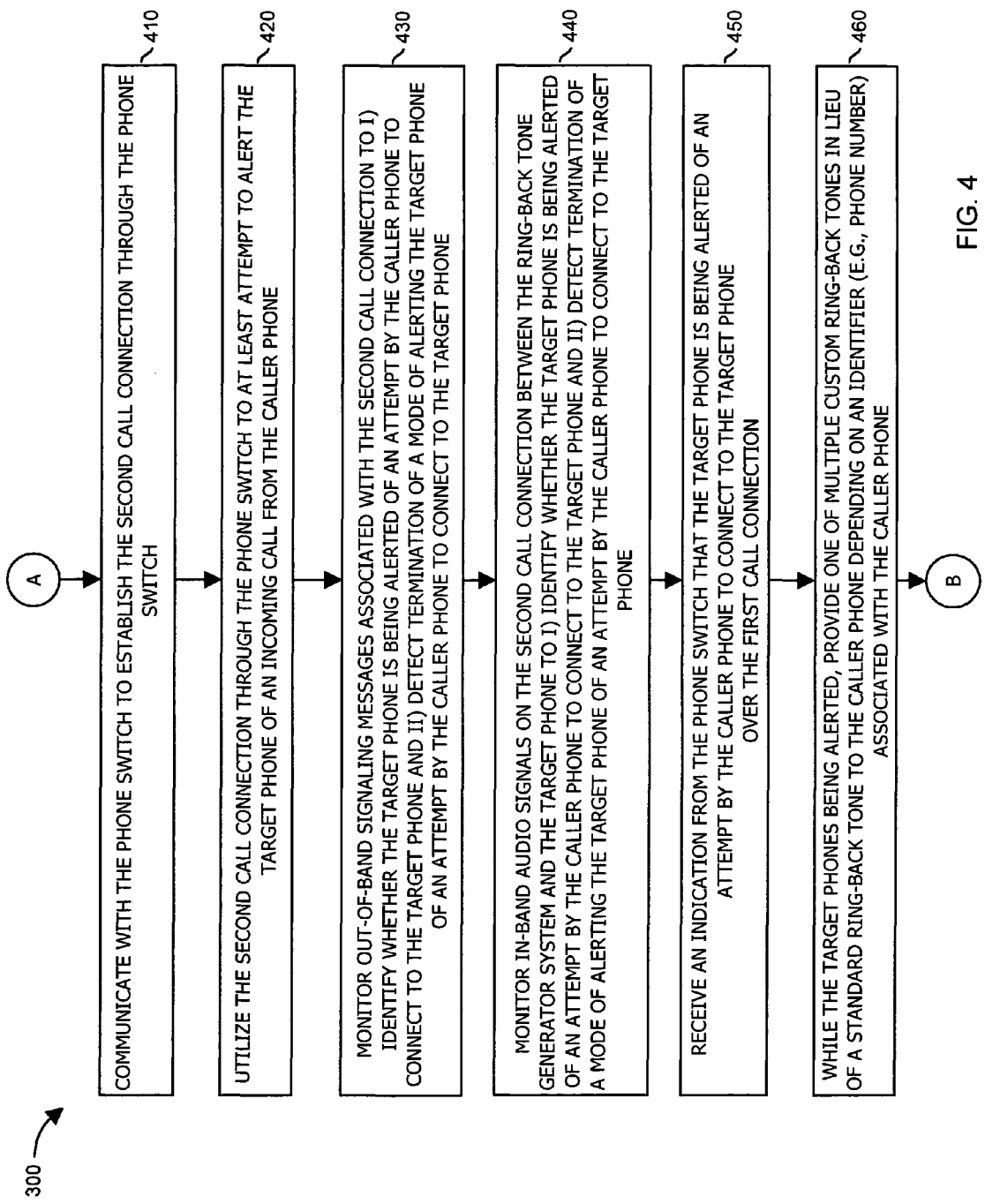
Figure 5:
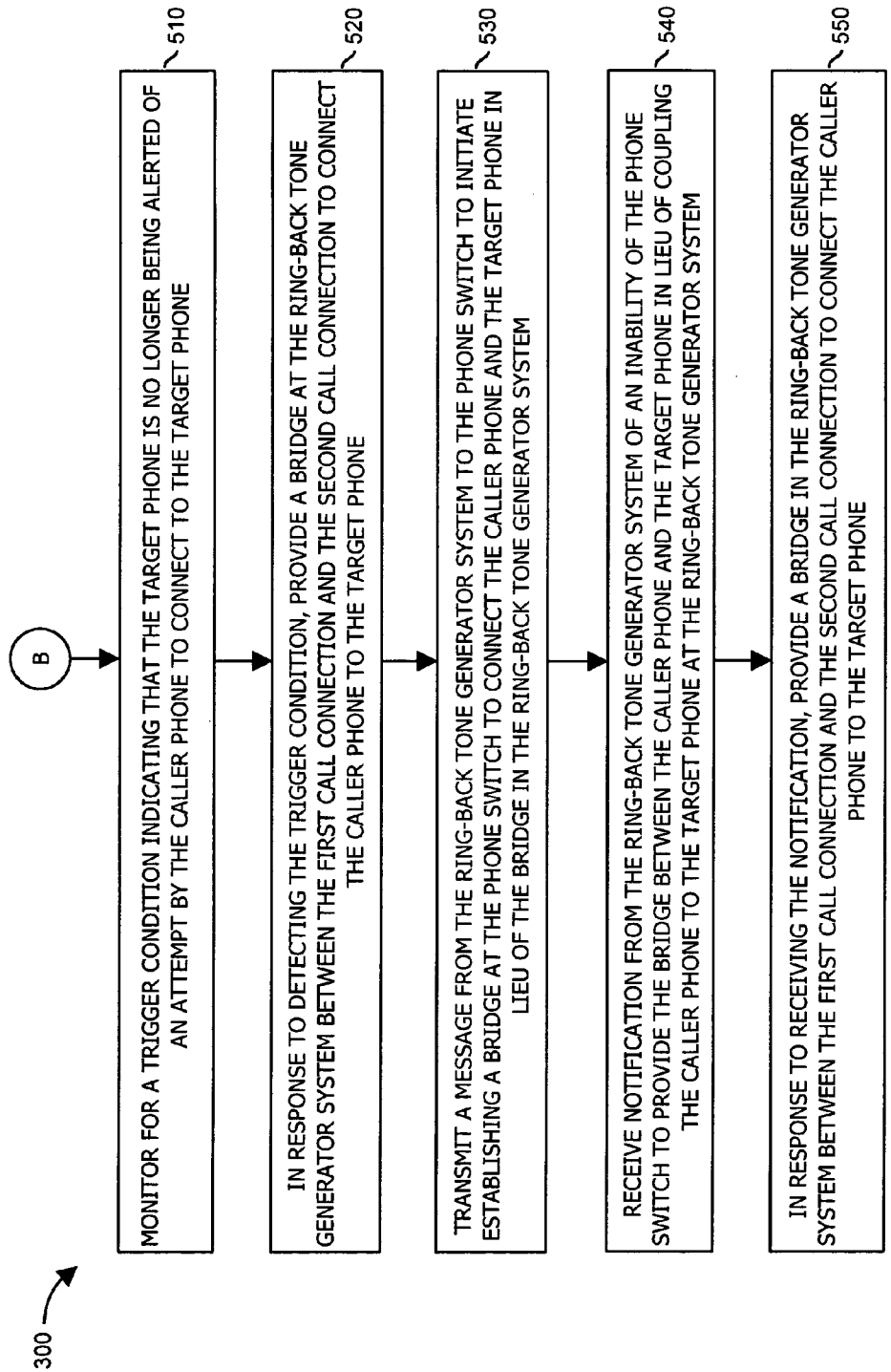

FIGS. 3-5 combine to form a flowchart 300 of processing steps performed by ring-back tone generator system 140. In general, flowchart 300 illustrates how ring-back tone generator system 140 processes a call connection request 104 to provide a custom ring-back tone to caller phone 110.

In step 310, ring-back tone generator system 140 receives an inbound call connection request 104 forwarded from a phone switch system 130 (such as an MSC) that itself receives the inbound call connection request 102 from a caller phone 110 attempting to connect to a target phone 120 (e.g., a subscriber).

In step 320, the ring-back tone generator system 140 initiates generation of a first call connection path 124 on which to provide the customized ring-back tone (and/or custom video image data) to the caller phone 110. The ring-back tone generator system 140 also transmits, based on receiving the inbound call connection request 124, an outbound call connection request 126 to the phone switch system 130 to establish a second call connection path 126 through the phone switch system 130 to the target phone 120. Consequently, an MSC in a conventional ring-back tone generator system that normally handles such call processing redirects a call connection request 102 from the caller phone 110 and relies on the ring-back tone generator system 140 to handle call processing and provide a custom ring-back tone service.

In step 340, according to one configuration, the ring-back tone generator system 140 provides a flag associated with the outbound call connection request 106 from the ring-back tone generator system 140 to differentiate the outbound call connection request 106 from the inbound call connection request 104. Thus, a phone switch system 130 that utilizes a map or table 135 to identify which received call connection requests to redirect to the ring-back tone generator system 140 will not redirect the received outbound call connection request 106 back to the ring-back tone generator system 140 in an endless loop.

In steps 350 and 360, the ring-back tone generator system 140 maintains the first call connection path 124 to include a first trunk 142-1 of the ring-back tone generator system 140 and the second call connection path 126 to include a second trunk 142-2 of the ring-back tone generator system 140. Based on use of trunks and other resources, the ring-back tone generator system 140, therefore, has the ability to receive calls and place calls on different call connection legs (i.e., different call connection paths).

Referring now to FIG. 4, in step 410, the ring-back tone generator system 140 communicates with the phone switch system 130 (from which the ring-back tone generator system 130 receives the inbound call request 104) to establish the second call connection path 126 through the phone switch system 130. Consequently, in one configuration, both the first call connection path 124 and the second call connection path 126 terminate at the ring-back tone generator system 140 and pass through phone switch system 130.

In step 420, at least initially, the ring-back tone generator system 140 utilizes the second call connection path 126 or related communication path through the phone switch system 130 to at least attempt to alert the target phone 120 of an incoming call from the caller phone 130. For example, while maintaining the first call connection path 124 with the caller phone 110 to eventually provide a custom ring-back tone, the ring-back tone generator system 140 initiates generation of the second call connection path 126 through the phone switch system 130 to alert the target phone 120 (e.g., the subscriber) of the call connection request by the caller phone 110.

Depending on the configuration, in steps 430 and/or 440, the ring-back tone generator system 140 monitors either or both in-band audio signals (e.g., audio signals transmitted on a call connection path) and out-of-band signaling messages (e.g., messages associated with a call connection path but not transmitted over the call connection path) to determine how to handle further call processing. For example, in one configuration, the ring-back tone generator system 140 monitors out-of-band signaling messages associated with the second call connection path to i) identify whether the target phone 120 is being alerted of an attempt by the caller phone 110 to connect to the target phone 120 and ii) detect termination of a mode of alerting the target phone 120 of an attempt by the caller phone 110 to connect to the target phone 120.

In another configuration, as in step 440, the ring-back tone generator system 140 monitors in-band audio signals on the second call connection path 126 between the ring-back tone generator system 140 and the target phone 120 to i) identify whether the target phone 120 is being alerted of an attempt by the caller phone 110 to connect to the target phone 120 and ii) detect termination of a mode of alerting the target phone 120 of an attempt by the caller phone 110 to connect to the target phone 120. The ring-back tone generator system 140 can further monitor the in-band and out-of-band signals to detect other conditions as well such as when an attempted call terminates in voice-mail.

In step 450, based on the above-mentioned monitoring, when the ring-back tone generator system 140 receives an indication from the phone switch system 130 that the target phone 120 is being alerted (e.g., initiation of ringing the target phone 120) of an attempt by the caller phone 110 to connect to the target phone 120, in step 460, the ring-back tone generator system 140 provides (e.g., transmits) one of multiple custom ring-back tones over the first call connection path 124 to the caller phone 110 in lieu of a standard ring-back tone. The ring-back tone generator system 140 determines which ring-back tone to play back on the first call connection path 124 to the caller phone 110 depending on an identifier (e.g., phone number) associated with the caller phone 110 and potentially an identifier (e.g., phone number of the subscriber phone) of the target phone 120 being called.

Certain configurations support passing of calling party identification information, including any calling ID presentation restrictions associated with the caller phone 110, received on the first call connection path 124 (e.g., from the phone switch system 130, caller phone 110, etc.) through to a called subscriber associated with the target phone 120 via the second call connection 126, such that the called subscriber can identify a call attempt as being from an actual calling party rather than from the ring-back tone generator system 140.

In one configuration, the ring-back tone generator system 140 simultaneously monitors out-of-band signaling messages associated with the second call connection path 126 and in-band audio signals on the second call connection path 126 to identify whether the target phone 120 is currently being alerted of an attempt by the caller phone 110 to connect to the target phone 120. This approach can provide better call processing results because the ring-back tone generator system 140 can more quickly and definitively detect that the target phone 120 is being alerted and provide a custom ring-back tone from the ring-back tone generator system 140 over the first call connection path 124 to the caller phone 110.

In certain circumstances, the ring-back tone generator system 140 receives an indication from the phone switch system 130 that the target phone 120 cannot be alerted of an attempt by the caller phone 110 to connect to the target phone 120 because a subscriber shut off his phone or the subscriber is currently using his phone and does not have call waiting. In response to such circumstances, the ring-back tone generator system 140 system immediately creates bridge 146 between the first call connection path 124 and the second call connection path 126 together in lieu of providing a custom ring-back tone to the caller phone 110. Consequently, the caller associated with the caller phone 110 receives a standard network tone (e.g., busy signal) or announcement identifying the reason for the call attempt failure in lieu of a custom ring-back tone. Otherwise providing the custom ring-back tone in this case may erroneously imply to the user of caller phone 110 that the call request was being placed to the target phone 120 but the subscriber just wasn't answering his target phone 120. Thus, ring-back tone generator system 140 can selectively provide standard network tones or announcements to the caller phone 110 instead of a custom ring-back tone.

In one configuration, while providing a custom ring-back tone to the caller phone 110 over the first call connection path 124, the ring-back tone generator system 140 monitors the first call connection path 124 for audio signals generated by a user of the caller phone 110. In response to detecting a presence of a particular audio signal based on an applied voice recognition algorithm, the ring-back tone generator system 140 initiates a corresponding phone function associated with the particular audio signal. For example, a user of the caller phone 110, while receiving the custom ring-back tone from the ring-back tone generator system 140, can say the words "call Jim" to automatically initiate another call connection leg by ring-back tone generator system 140 to a phone associated with Jim. In this case, the ring-back tone generator system 140 initiates call processing to include Jim in a three way call via a third call connection from the ring-back tone generator system 140 to Jim's phone. Thus, a three-way call can include Jim (via Jim's phone), the caller (via the caller phone), and the subscriber (via the target phone).

Referring now to FIG. 5, in step 510, while providing a custom ring-back tone, the ring-back tone generator system 140 monitors for a trigger condition (e.g., a presence of an in-band audio signal on the second call connection or out-of-band messaging signals) indicating that the target phone 120 is no longer being alerted of an attempt by the caller phone 110 to connect to the target phone 120.

In step 520, in response to detecting such a trigger condition, the ring-back tone generator system 140 provides a bridge 146 between the first call connection path 124 and the second call connection path 126 to connect the caller phone 110 to the target phone 120. Consequently, the ring-back tone generator system 140 enables a user of the caller phone 110 to speak with a subscriber of the target phone 120 without further playing the custom ring-back tone to the caller phone 110.

In one configuration, a subscriber can select whether the ring-back tone generator system 140 plays a custom audio clip (potentially different or the same as the custom ring-back tone) during a phone conversation between the caller phone 110 and the target phone 120. If the subscriber selects an audio clip to play in the background during a phone conversation, the ring-back tone generator system 140 continues to or starts to provide an appropriate customized audio (e.g., music) over the first call connection path 124 and the second call connection path 126 during an active session when a user of the caller phone 110 is able to speak with a user of the target phone 120.

It is possible that a subscriber of the target phone 120 has initiated call forwarding for any phone calls directed to his target phone 120. The ring-back tone generator system 140 monitors for a trigger condition indicating a forwarding of the second call connection path 126 to an alternative destination instead of the target phone 120. In response to detecting the trigger condition, the ring-back tone generator system 140 provides a bridge 146 at the ring-back tone generator system 140 between the caller phone 110 and the alternative destination (e.g., another phone device, voice mail, etc.). In one configuration, the ring-back tone generator system 140 utilizes an identifier (e.g., phone number) associated with the alternative destination to determine whether to provide a different custom ring-back tone to the caller phone 110 based on being forwarded to the alternative destination. If so, the ring-back tone generator system 140 provides a custom ring-back tone associated with the alternative destination (and caller phone) over the first call connection path 124 to the caller phone 110.

As previously discussed, the ring-back tone generator system 140 optionally provides a bridge 146 between the first call connection path 124 and the call second connection path 126 to couple the caller phone 110 to the target phone 120. In one configuration, the ring-back tone generator system 140 passes off a duty of bridging the first call connection path 124 and the second call connection path 126 to the phone switch system 130 in the path of the first call connection path 124 and second call connection path 126 to free up resources (e.g., phone trunks) of the ring-back tone generator system 140 for new calls. For example, in step 530, the ring-back tone generator system 140 transmits a message from the ring-back tone generator system 140 to the phone switch system 130 to initiate establishing a bridge 236 at the phone switch system 130 to connect the caller phone 110 and the target phone 120 in lieu of the bridge 146 in the ring-back tone generator system 140. As discussed, the first call connection path 124 and second call connection path 126 pass through the phone switch system 130 that initially redirected the call connection request 104 to the ring-back tone generator system 140. The phone switch system 130 may or may not be able to handle this call processing request of providing a bridge 236.

In step 540, the ring-back tone generator system 140 receives notification from the phone switch system 130 of an inability of the phone switch system 130 to provide the bridge 236 between the caller phone 110 and the target phone 120 in lieu of coupling the caller phone 110 to the target phone 120 via use of the ring-back tone generator system 140. In such a case, the ring-back tone generator system 140 can continue to bridge the first call connection path 124 and the second call connection path 126 so that the caller phone 110 can communicate with the target phone 120.

In step 550, in response to receiving the notification, the ring-back tone generator system 140 provides a bridge 146 in the ring-back tone generator system 140 between the first call connection path 124 and the second call connection path 126 to connect the caller phone 110 to the target phone 120.

Figure 6:
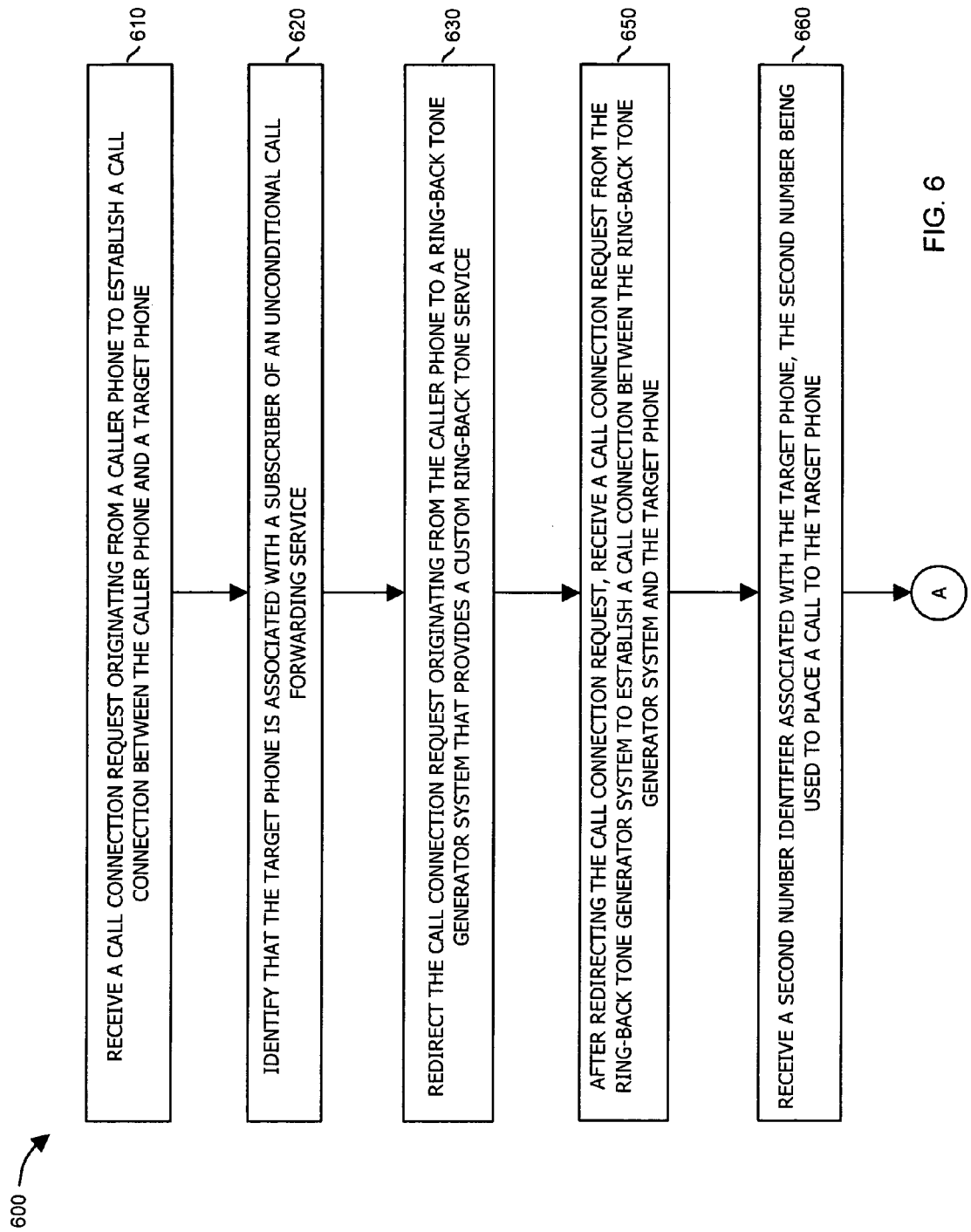
FIGS. 6-8 combine to form a flowchart illustrating example processing steps of a phone switch system.
Figure 7:
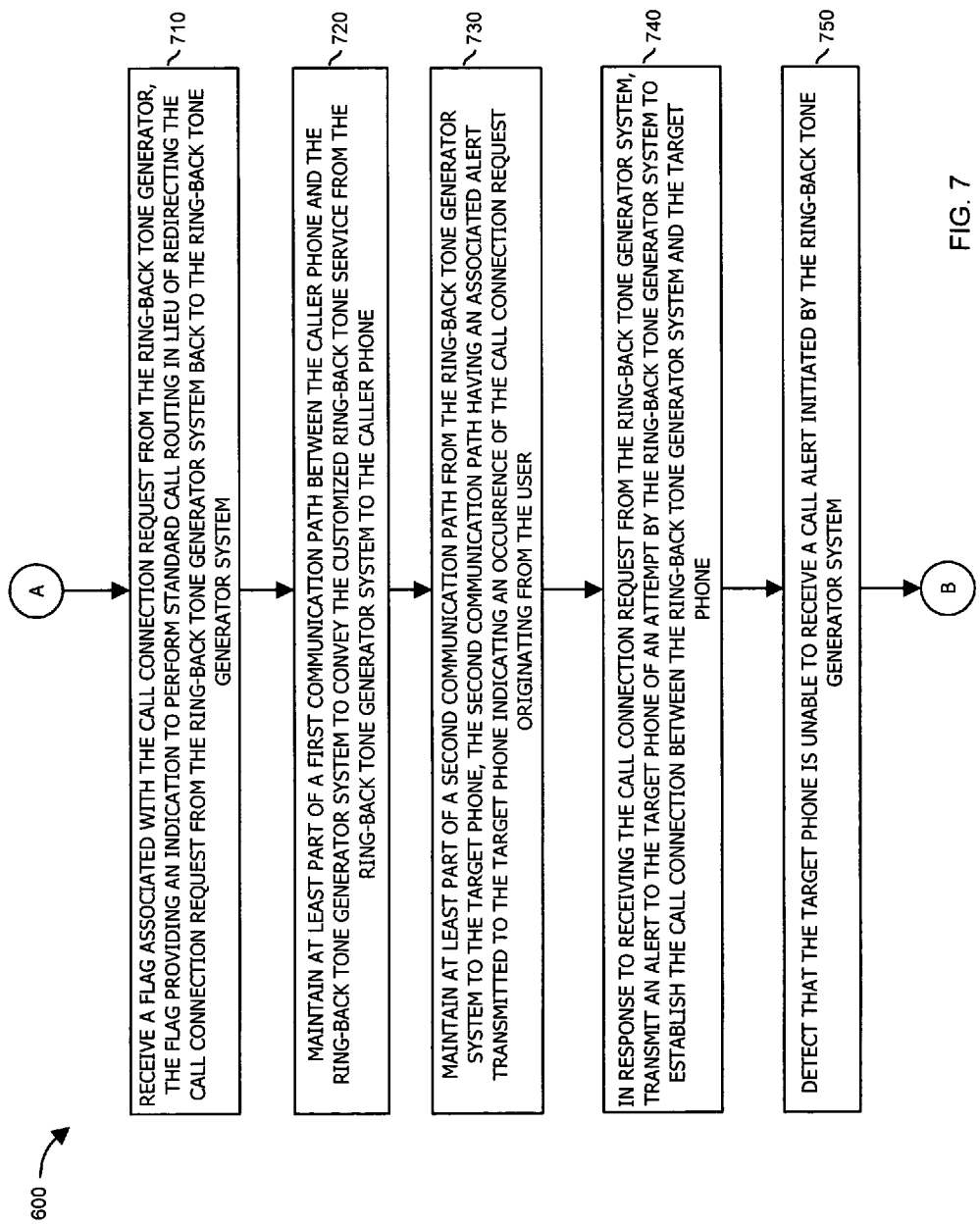
Figure 8:
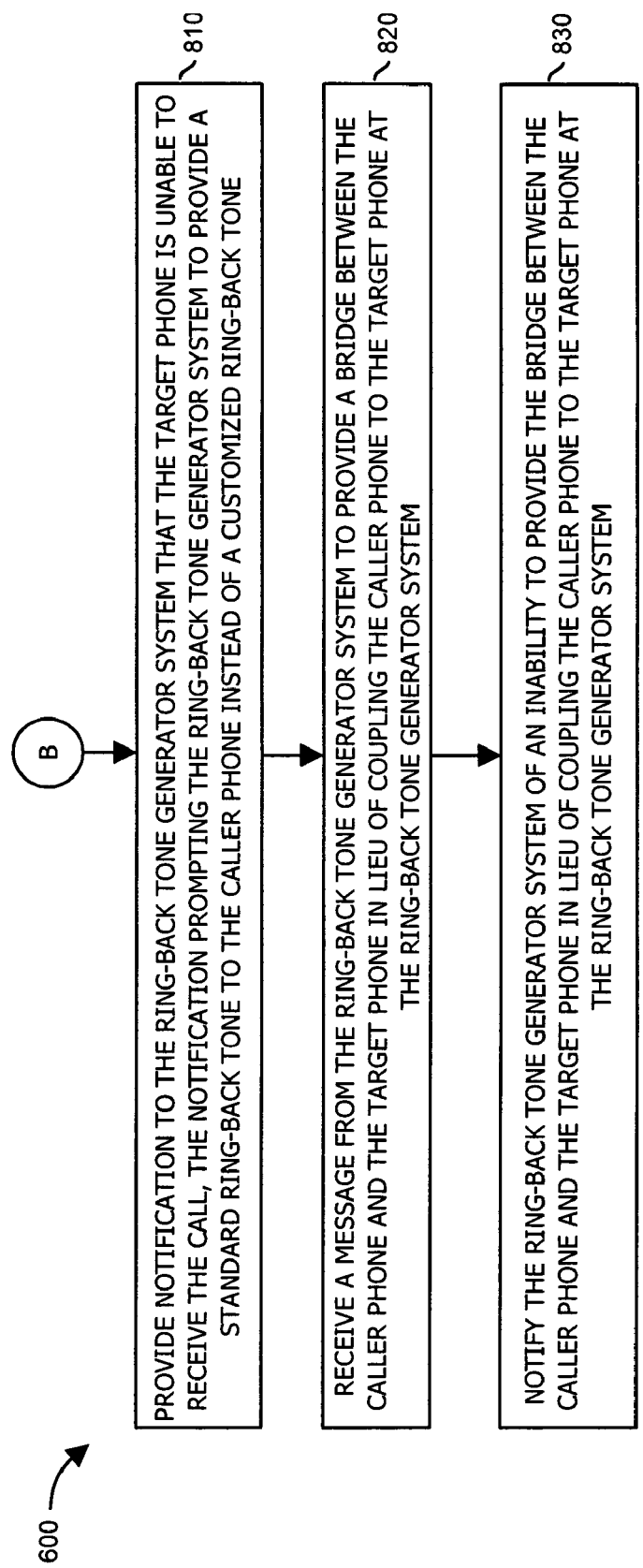

FIGS. 6-8 combine to form a flowchart 600 of processing steps performed by phone switch system 130 according to example configurations herein. In general, flowchart 600 illustrates how phone switch system 130 supports generating a custom ring-back tone to caller phone 110.

In step 610, phone switch system 130 such as an MSC receives a call connection request originating from a caller phone 110 to establish a call connection between the caller phone 110 and a target phone 120.

In step 620, the phone switch system 130 identifies that the target phone 120 is associated with a subscriber of an unconditional call forwarding service, and that service is activated such that all calls to the subscriber are forwarded to the ring-back tone generator system.

In step 630, the phone switch system 130 redirects the call connection request 102 originating from the caller phone 110 to the ring-back tone generator system 140 that provides a customized ring-back tone service. In one configuration, the phone switch utilizes an identifier associated with the caller phone 110 to generate an unconditional call forwarding message to the ring-back tone generator system 140. This is one example of how the phone switch system 130 forwards the call connection request 102 to the ring-back tone generator system 140 rather than directly placing an outgoing call to the target phone 120 itself.

In step 650, after redirecting the call connection request 104, the phone switch system 130 receives a call connection request 106 from the ring-back tone generator system 140 to establish a call connection path between the ring-back tone generator system 140 and the target phone 120.

In step 660, the phone switch system 130 receives call connection request 106 including a second number identifying the target phone 120 as a destination of call connection request 106. In one configuration, the second number is unique with respect to the first identifier number (identifying target phone 120 as the destination of the call) received in call connection request 102. The phone switch system 130 identifies (based on use of the second number) that the call connection request 106 should not be redirected back to the ring-back tone generator system 140 and utilizes the second number to place (potentially via normal call processing) a call connection to the target phone 120. As discussed above, use of two different numbers for the same target phone 120 enables the phone switch system 130 and the ring-back tone generator system 140 to avoid an endless loop of transmitting the call connection request 104/106 between the phone switch system 130 and the ring-back tone generator system 140.

Referring now to FIG. 7, in step 710, the phone switch system 130 receives a flag associated with the call connection request 106 received from the ring-back tone generator 140. The flag provides a signal to differentiate how to handle call processing associated with the call connection request 106. For example, the flag provides an indication to the phone switch system 130 to perform standard call routing in lieu of redirecting the call connection request 106 back to the ring-back tone generator system 140. Thus, a call connection request 106 can be based on the same identifier (e.g., phone number of the target phone 120) as in the call connection request 104 or call connection request 102 without causing the call connection request 106 from being passed in an endless loop between the phone switch system 130 and the ring-back tone generator system 140.

In steps 720 and 730, the phone switch system 130 maintains at least part of a first call connection path 124 (e.g., communication path) between the caller phone 110 and the ring-back tone generator system 140 to convey the customized ring-back tone service from the ring-back tone generator system 140 to the caller phone 110. Additionally, the phone switch system 130 maintains at least part of a second call connection path 126 (e.g., second communication path) from the ring-back tone generator system 140 to the target phone 120. The ring-back tone generator system 140 utilizes the second communication path through the phone switch system 130 to alert the target phone 120 of an attempt by the caller phone 110 to connect to the target phone 120.

In step 740, in response to receiving the call connection request 106 from the ring-back tone generator system 140, the phone switch system 130 transmits or forwards an alert to the target phone 120 of an attempt by the ring-back tone generator system 140 to establish the call connection path 126 between the ring-back tone generator system 140 and the target phone 120.

In step 750, the phone switch system 130 detects that target phone 120 is unable to receive a call alert initiated by the ring-back tone generator system 140.

Referring now to FIG. 8, in step 810, the phone switch system 130 provides notification to the ring-back tone generator system 140 that the target phone 120 is unable to receive the call. This notification prompts the ring-back tone generator system 140 to immediately create bridge 146 between the first call connection path 124 and the second call connection path 126, allowing the caller phone 110 to receive the standard network tone or announcement that identifies the reason for the call attempt failure.

As previously discussed for one configuration, if the ring-back tone generator system 140 provides a custom ring-back tone and the subscriber answers to 120, the ring-back tone generator system 140 attempts to hand off bridging of the first call connection path 124 and second call connection path 126 terminating at the ring-back tone generator system 140 and passing through the phone switch system 140. For example, in step 820, the phone switch system 130 receives a message from the ring-back tone generator system 140 to provide a bridge 236 between the caller phone 110 and the target phone 120 in lieu of coupling the caller phone 110 to the target phone 120 at the ring-back tone generator system 140.

The phone switch system 130 may or may not be able to provide the bridge 236 enabling the ring-back tone generator system 140 to free up some of its resources. If not, in step 830, the phone switch system 130 notifies the ring-back tone generator system 140 of an inability to provide the bridge 236 between the caller phone 110 and the target phone 120 in lieu of coupling the caller phone 110 to the target phone 120 at the ring-back tone generator system 140 via bridge 146. In the alternative, if the phone switch system 130 has the ability to provide bridge 236, the phone switch system 130 notifies the ring-back tone generator system 140 that the phone switch system 130 can accommodate the handoff request and provide a bridge 236 to connect the caller phone 110 and target phone 120.

As discussed above, configurations herein include equipment and methods for integrating a RBT (Ring-back Tone) platform to an existing phone switching network. In furtherance of the previous configurations, two different implementations are presented: an Intelligent Network (IN) approach and a Service Node (SN) approach. Note that while the following detailed configurations use a wireless network illustrate example operations, techniques herein are directed to networks in general and "wireline" networks such as a PSTN (Public Switched Telephone Network) using similar techniques.

1. Intelligent Network (IN) Approach

Figure 9:
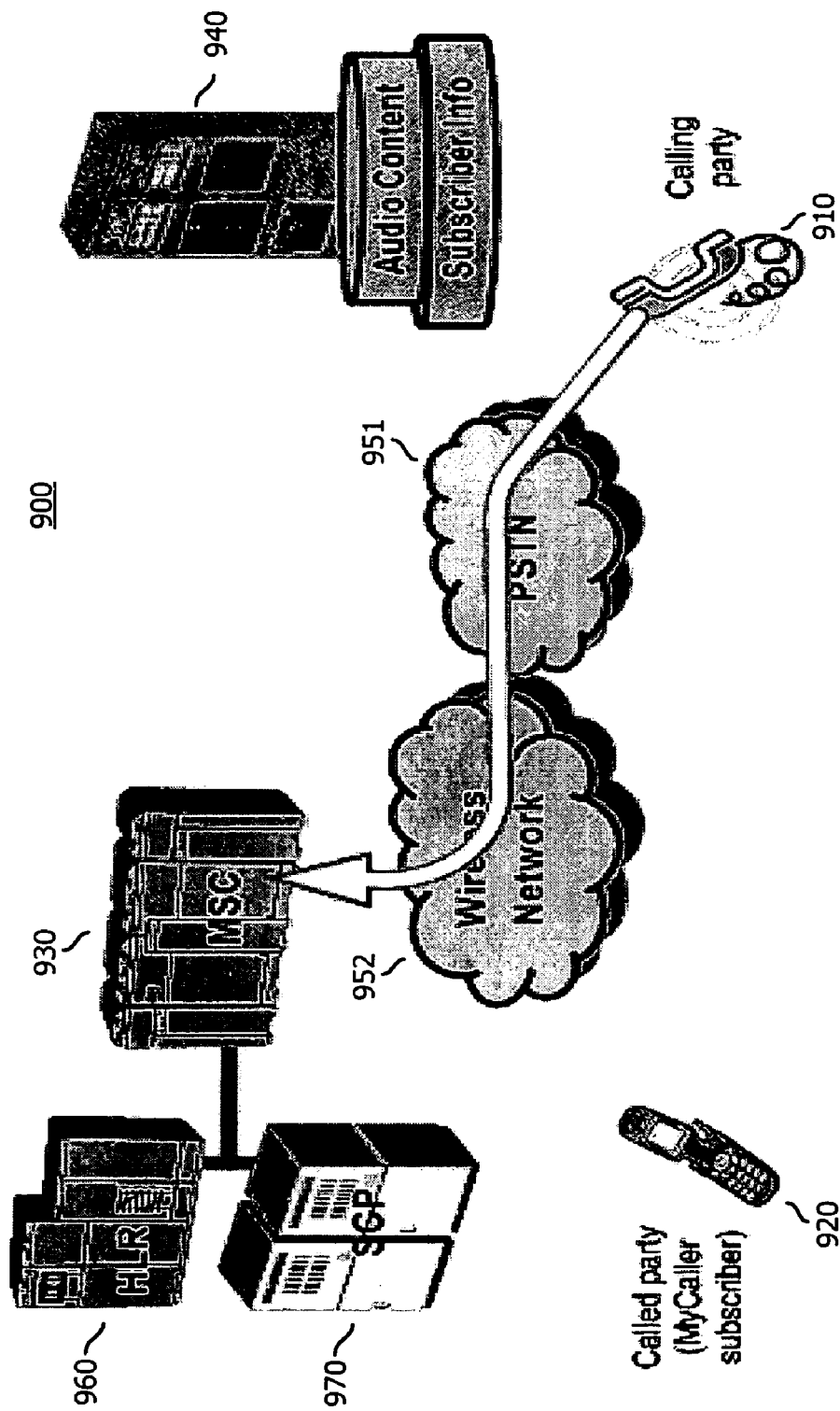
FIG. 9 is a diagram illustrating an example of receiving an incoming call.
Figure 10:
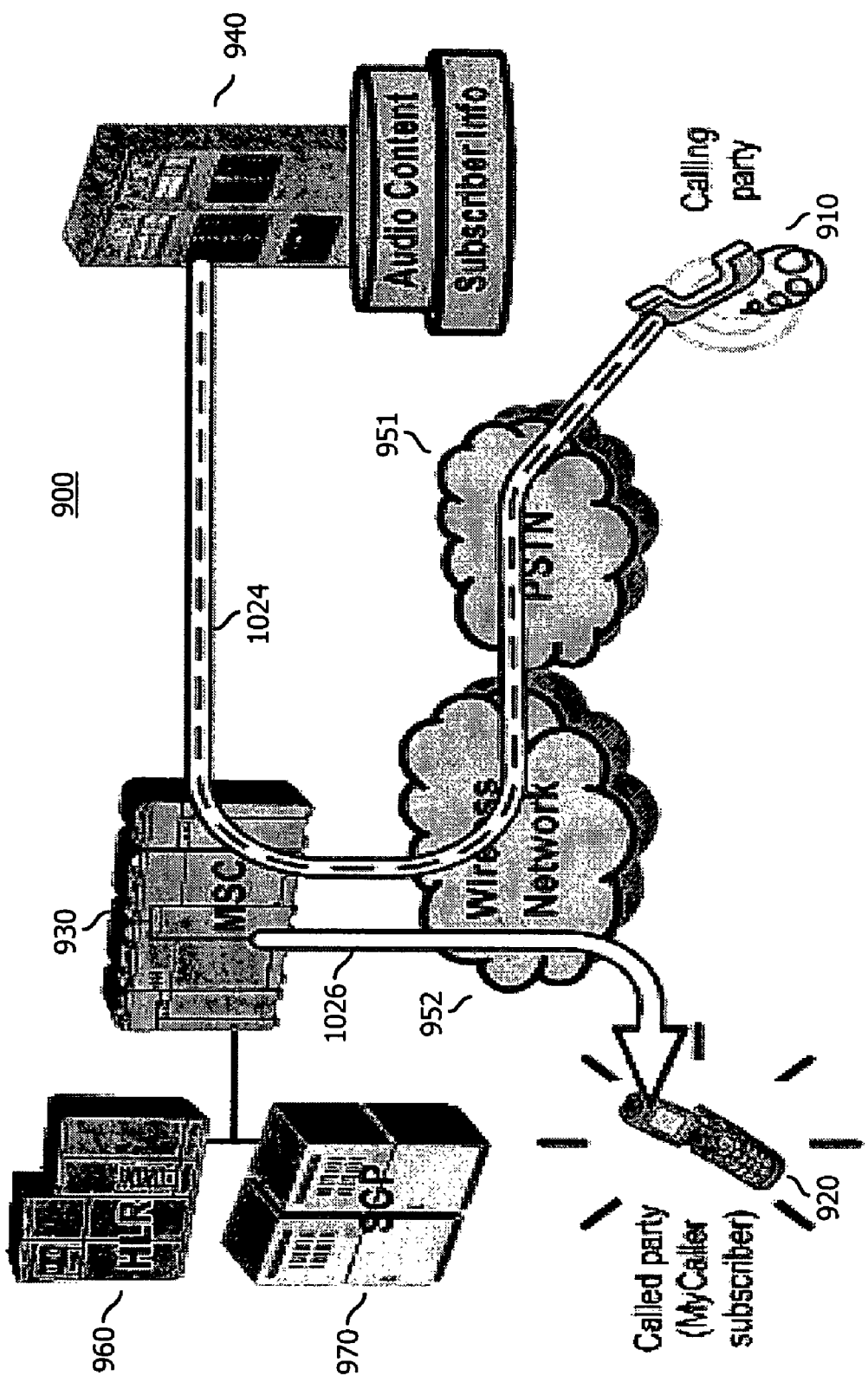
FIG. 10 is a diagram illustrating an example of generating a custom ring-back tone.
Figure 11:
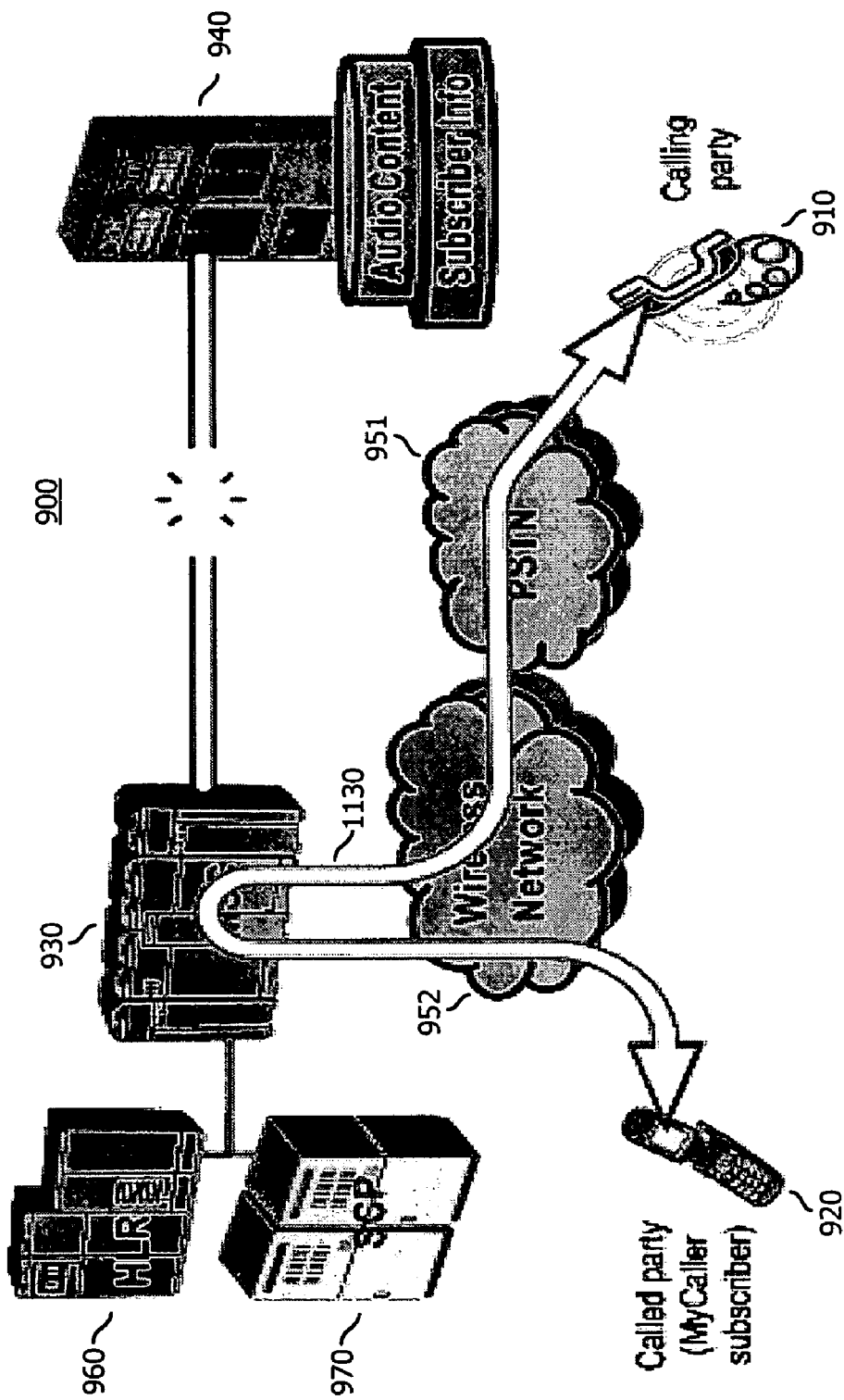
FIG. 11 is a diagram illustrating release of the custom ring-back tone generation system and bridging of two call legs.

FIGS. 9-11 are diagrams illustrating a communication system 900 implementing an IN approach according to a configuration herein. As shown, communication system 900 includes caller phone 910, target phone 920, MSC (Mobile Switching Center) 930, ring-back tone generator system 940, PSTN (Public Switched Telephone Network) 951, wireless network 952, HLR (Home Location Register) 960, and SCP (Service Control Point) 970.

In one configuration, the SCP 970 is a general purpose computer including an associated database for storing data and a signaling interface for communicating with the existing switching networks 951 and 952. SCP 970 also includes a processor, memory, and a standard interface between the SCP 970 and the switching network to support communications. The primary protocols used in the SCP 970 interface include AIN (Advanced Intelligent Network), WIN (Wireless Intelligent Network), INAP (Intelligent Network Application Part) and CAMEL.

In addition to inclusion of the SCP 970 to support custom ring-back services, certain network switching equipment in communication system 900 is "IN-capable." For example, the switches (e.g., MSC 930) are capable of i) suspending call processing activity at certain well-defined points in a call (know as trigger detection points) and ii) communicating with the SCP 970 to receive further instructions on how to process a call. The MSC 930 has the ability to notify the SCP 970 of certain events during the life of the call, such as called party alerting, call answer, and call disconnected. As mentioned, the switching equipment (e.g., MSC 930) communicates with the SCP 970 using AIN, WIN, INAP, or CAMEL protocols.

One purpose of using IN technology to deploy enhanced services is to provide freedom to create a service without depending on each switching equipment vendor to develop costly custom software upgrades for the new service. This enables a network operator overseeing at least a portion of communication system 900 to create a service that operates identically across all switching equipment in their network, regardless of equipment vendor. In one configuration, this is largely possible because a custom ring-back service is based on standardized capabilities and protocols.

Certain versions of the IN protocols such as INAP capability set 1 and CAMEL release 2 define only simple capabilities and may be insufficient to implement a reliable RBT service. However, more recent versions of these protocols, known as INAP capability set 2 (CS-2) and CAMEL release 4 (based on INAP CS-2) contain new call handling capabilities (which were originally developed for support of multi-party calls such as 3-party conferencing) can be employed to support an IN standards-based custom RBT service according to example configurations herein.

Basic Operation of Intelligent Network (IN) Approach

FIGS. 9-11 below illustrate the basic operation of the RBT service using an IN approach. For example, a terminating call attempt trigger, such as the Termination_Attempt_Authorized trigger, is provisioned in the MSC 930 for each custom RBT subscriber. MSC 930 receives an incoming call from caller phone 910 to a target phone 920. When MSC 930 detects the call attempt trigger for the new call from caller phone 910, the MSC 930 transfers control of the call to the SCP 970 assigned for that target phone 920 (e.g., subscriber phone).

The SCP 970 verifies that the call is for a custom RBT subscriber and then instructs the MSC 930 to continue the call processing to the target phone 920. The SCP 970 also arms the trigger detection points for further call status changes (e.g., alerting, busy, answered, disconnected, etc.) on that call. Once the MSC 930 determines that the call to target phone 920 is alerting, the SCP 970 is again triggered of this condition. In response to the trigger, the SCP 970 instructs the MSC 930 to set up a call leg to the RBT platform and connect the call leg to the caller phone 910 as shown by call connection path 1024 in FIG. 10. The ring-back tone generator system 940 determines the appropriate audio clip to play for the ring-back tone based on the phone number associated with the caller phone 910, the phone number of the target phone 920, as well as other information in the call setup message from the MSC 930. The ring-back tone generator system 940 plays the clip over the selected audio circuit to the caller phone 910 so that a user of the caller phone 910 hears the custom ring-back tone in lieu of a standard ring-back tone.

When the MSC 930 detects that a pending call from the caller phone 910 to the target phone 920 has been answered by a subscriber, the MSC 930 notifies the SCP 970 of the condition. In response, the SCP 970 instructs the MSC 930 to connect the caller phone 910 to the target phone 920 via call connection path 1130 and drop the connection to the ring-back tone generator system 940 as shown in FIG. 11. The SCP 970 then disarms the call status triggers for the remainder of the call and allows the MSC 930 to resume normal call processing for the remainder of the call.

Figure 12:
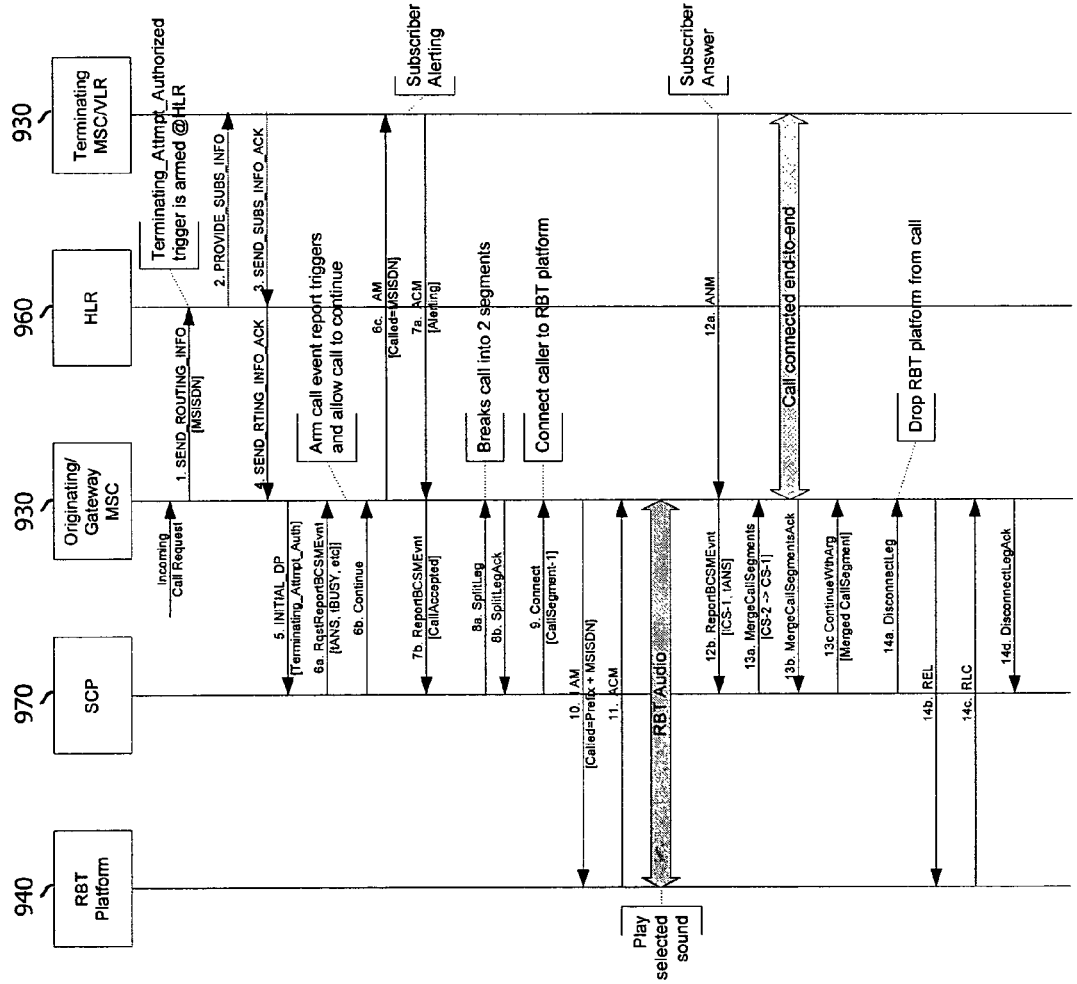
FIG. 12 is an example timing diagram illustrating call handling.

FIG. 12 is a timing diagram illustrating an example implementation of communication system 900 and custom RBT service based on SCP 970 using the INAP CS-2 protocol. Other configurations use INAP CS-2 or other IN protocols providing similar capabilities.

Steps Functional Description 1-4 These steps include normal GSM incoming call setup—HLR 960 returns terminating trigger information for target phone 920 subscriber to MSC 930

5 MSC 930 detects Terminating_Attempt_Authorized trigger and sends Initial_DP event to SCP 970

6a-c SCP 970 arms detection points for call accept, answer, busy, and disconnect and instructs MSC 930 to continue with call termination to target phone 920 subscriber; MSC 930 initiates call setup to visited MSC 7a-b Upon detection that target phone 920 subscriber is alerting, originating (gateway) MSC 930 reports call accept event to SCP 970

8a-b SCP 970 instructs MSC 930 to split the call into 2 segments: the caller phone 910 connects to MSC 930 via a first segment and MSC connects to called target phone 920 subscriber via a second segment 9-10 SCP 970 instructs MSC 930 to connect first segment (caller) to the ring-back tone generator system 940 while the second segment continues alerting the called target phone 920 subscriber; this causes the MSC 930 to set up a new call to the ring-back tone generator system 940 using SS7 ISUP 11 Ring-back tone generator system 940 queries its subscriber database to determine the audio clip to play using calling number, called number, and other information from the ISUP IAM message, then returns an ACM message to the MSC 930 and begins playing the audio clip 12a-b Upon detection that called target phone 920 subscriber has answered the call, originating (gateway) MSC 930 reports call answered event to SCP 970

13a-b SCP 970 instructs MSC 930 to merge first and second call segments, connecting the caller phone 910 to the target phone 920 subscriber, and allow that call to continue 14a-d SCP 970 instructs MSC 930 to drop ring-back tone generator system 940 from the call, causing MSC 930 to initiate normal ISUP call release sequence 2. Service Node Approach The service node approach in the present application employs an RBT platform (e.g., ring-back tone generator system) connected to the originating or terminating MSC by voice trunks controlled by the SS7 ISUP signaling protocol. In this configuration, existing MSC software configuration options are used to redirect calls for RBT subscribers to the RBT platform intelligent peripheral.

In one configuration, the RBT platform IP consists of a general purpose processor, disk storage for all the audio clips, digital trunk interface cards with the ability to play audio files and to detect call progress tones in the audio channels (e.g., NMS CG-series boards with on-board DSPs), and the corresponding signaling protocol software (e.g., SS7 ISUP). For the service node approach, the IP also includes a digital switching fabric that allows it to connect an incoming trunk circuit to an outgoing trunk circuit.

Basic Operation of the Service Node Approach

Figure 13:
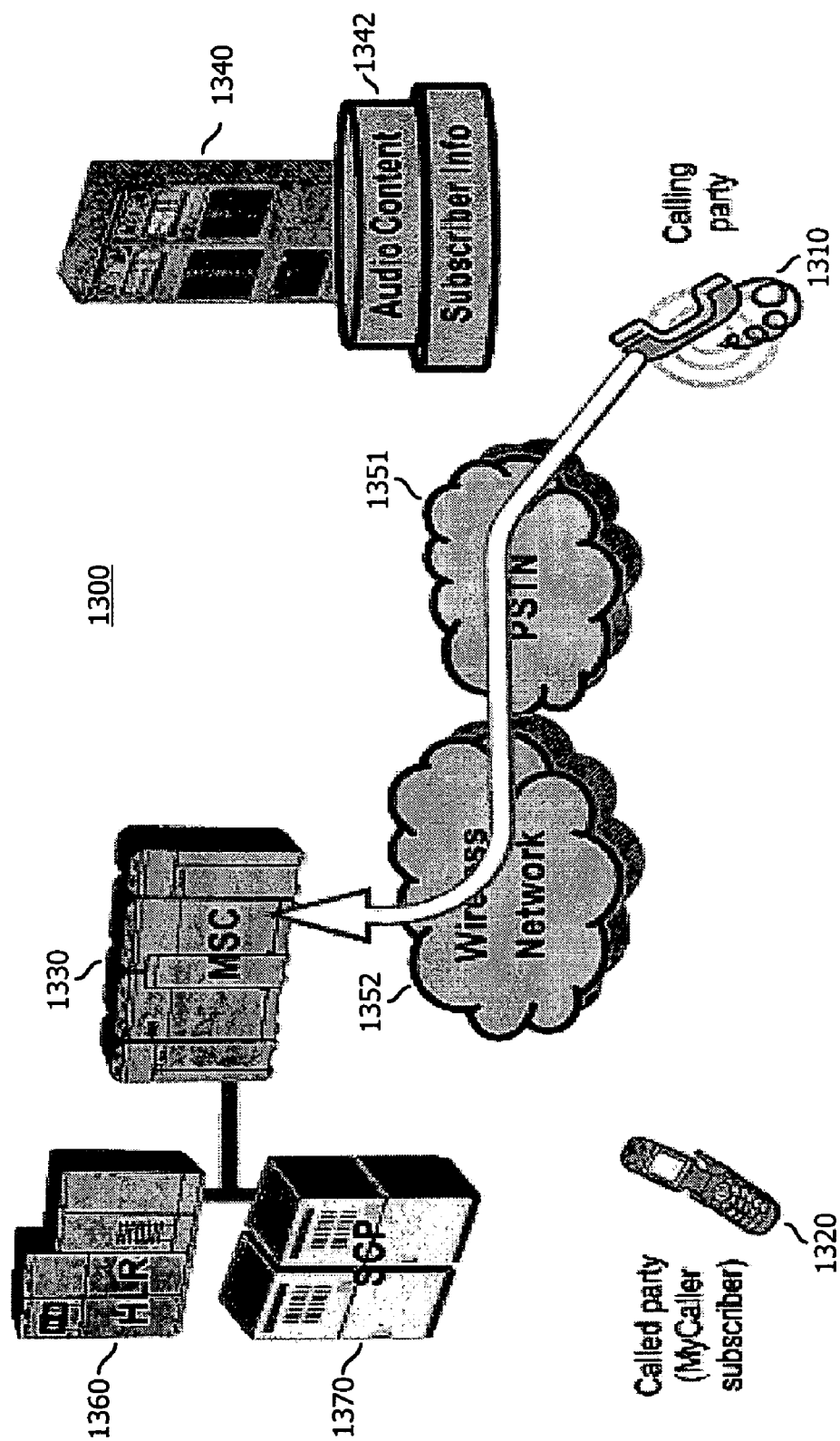
FIG. 13 is a diagram illustrating an example of receiving an incoming call.
Figure 14:
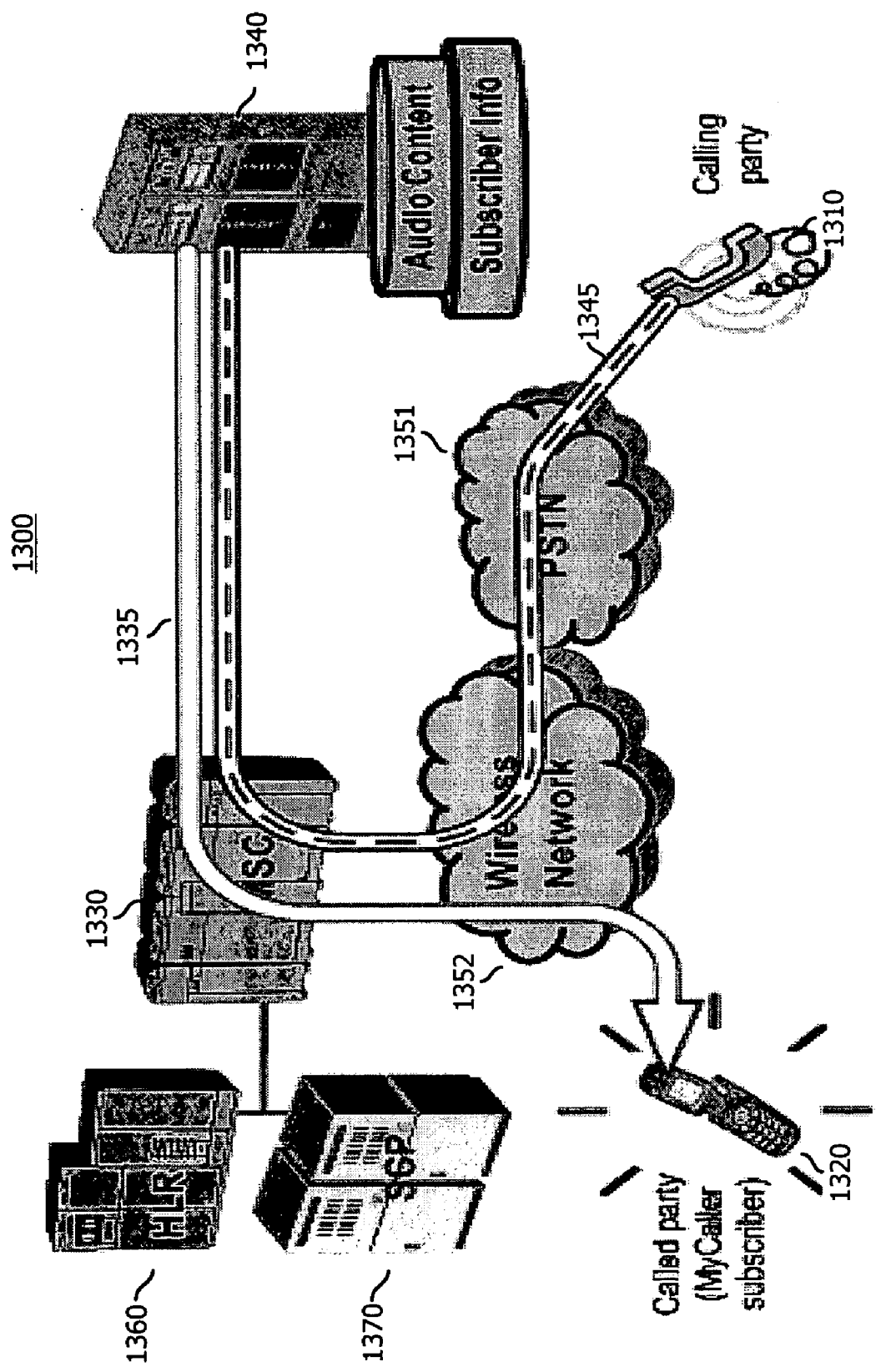
FIG. 14 is a diagram illustrating establishment of two call legs and generation of a custom ring-back tone.
Figure 15:
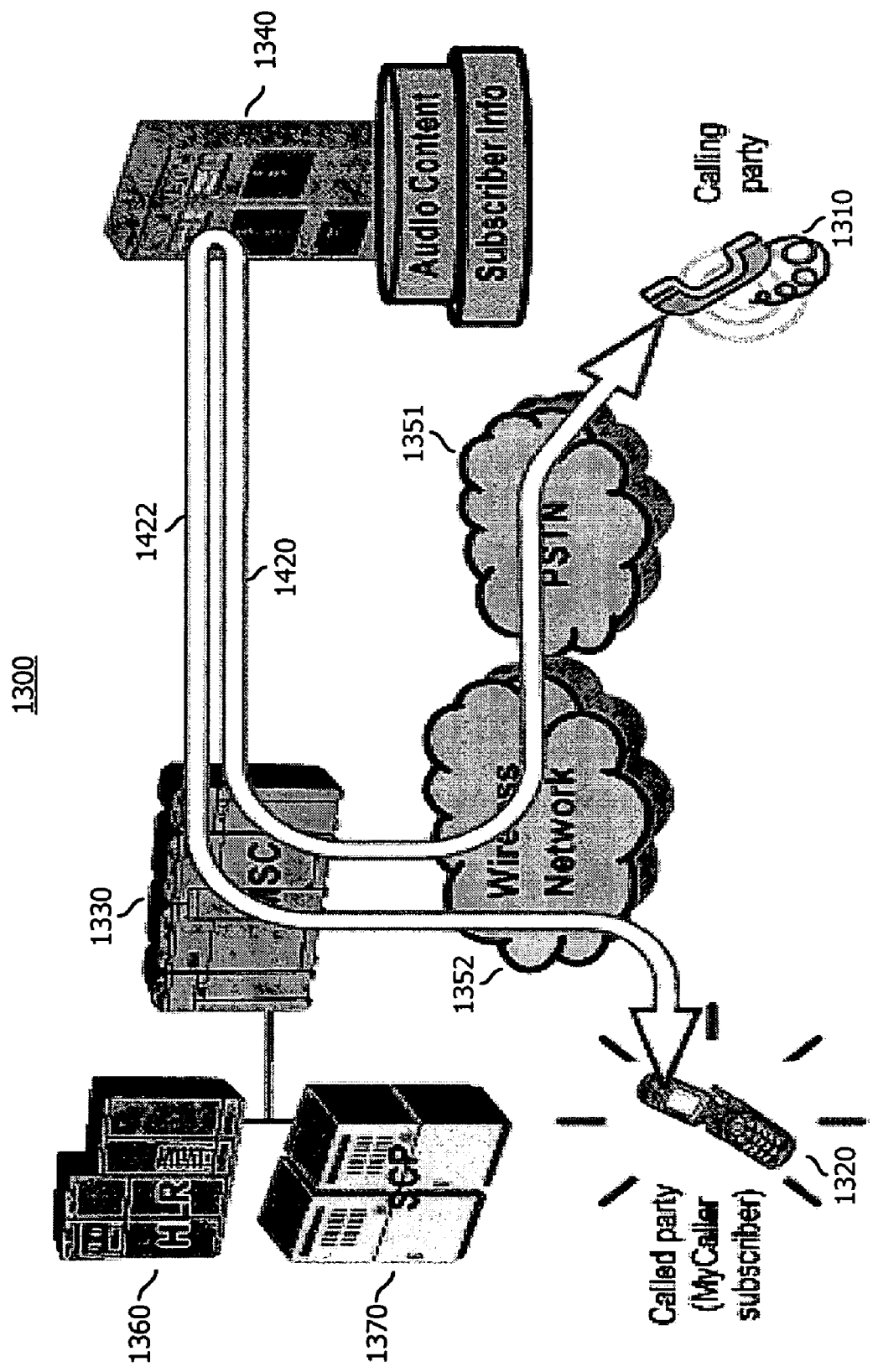
FIG. 15 is a diagram illustrating an example of bridging two call legs at the custom ring-back tone generation system.

FIGS. 13-15 are diagrams illustrating a communication system 1300 implementing a service node approach. As shown, communication system 1300 includes caller phone 1310, target phone 1320, MSC (Mobile Switching Center) 1330, ring-back tone generator system 1340, PSTN (Public Switched Telephone Network) 1351, wireless network 1352, HLR (Home Location Register) 1360, and SCP (Service Control Point) 1370. Ring-back tone generator system 1340 includes disk storage 1342 for audio clips. In general, FIGS. 13-15 are diagrams illustrating a connection sequence implemented by ring-back tone generator system 1340 in order to transparently implement a custom RBT service in an existing switching network such as wireless network 1352.

As shown in FIG. 13, when an MSC 1330 receives an incoming call from caller phone 1310 and identifies that the called party (e.g., target phone 1320) is a subscriber of the custom RBT service, the MSC 1330 forwards the call to the ring-back tone generator system 1340 as shown in FIG. 14. The ring-back tone generator system 1340 queries its respective subscriber database to determine the audio clip to play and then places a second call connection 1345 through the same MSC 1330 or a different MSC to alert the called target phone 1320 subscriber of the incoming call from caller phone 1310. When the MSC 1330 indicates that the target phone 1320 subscriber is alerting, the ring-back tone generator system 1340 plays the selected ring-back sound file on the first call connection 1335 to the caller phone 1310. As shown in FIG. 15, when the subscriber answers the target phone 1320, the ring-back tone generator system 1340 bridges the 2 call legs (e.g., call leg 1420 and call leg 1422 together using its internal switch fabric for the duration of the call.

Figure 16:
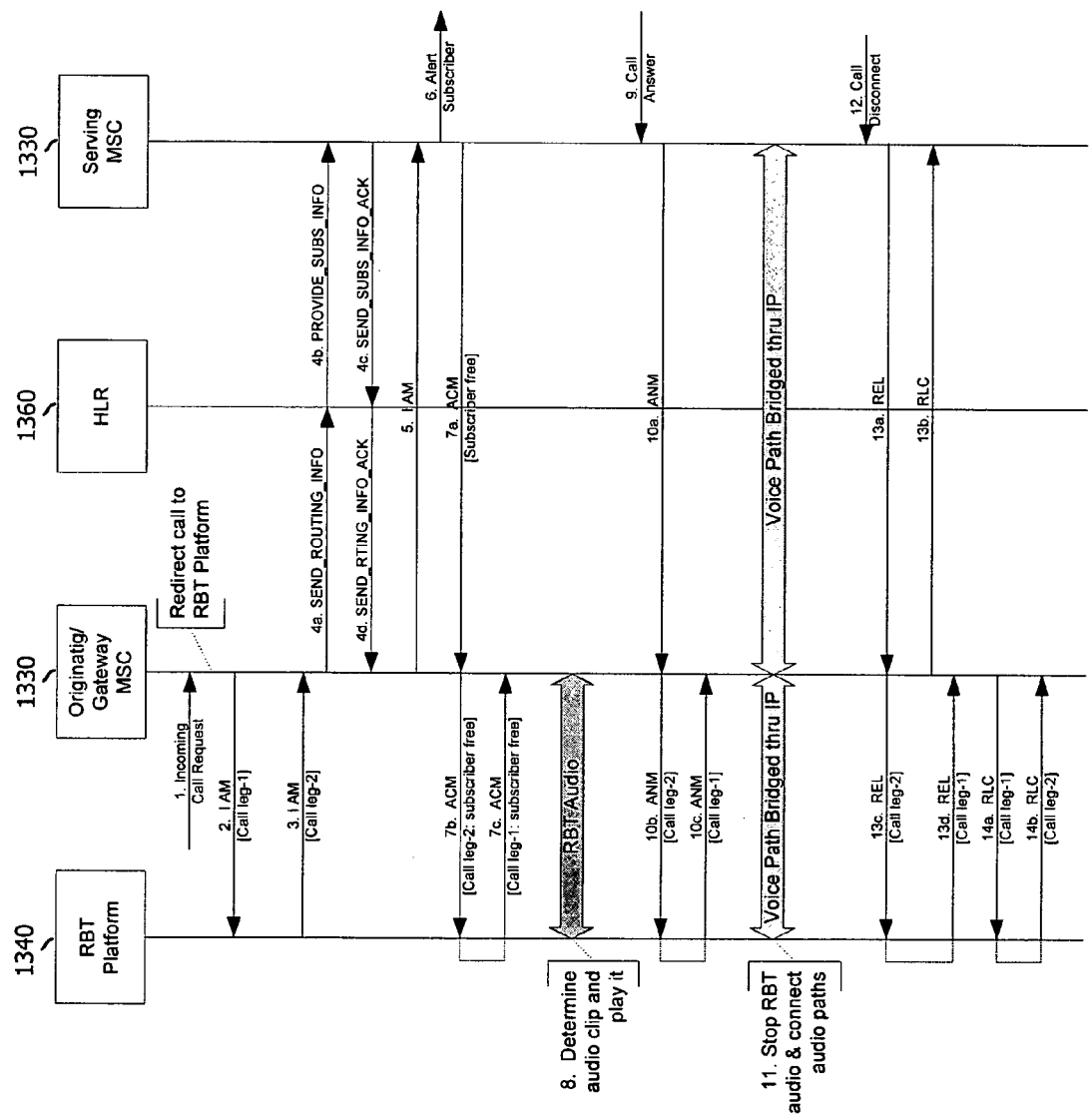
FIG. 16 is an example timing diagram illustrating call handling.

FIG. 16 is a timing diagram illustrating an example of call signaling sequences between an existing network and the RBT platform using the SS7-ISUP protocol.

During the life of the call, other signaling messages may be passed between the originating and terminating switches, such as call progress messages (e.g., call has been forwarded) or requests for supplementary services. These signaling messages are passed through the RBT platform with the incoming and outgoing circuit numbers mapped but the messages otherwise unchanged to preserve the operation of the services that rely on these messages.

Call Progress Monitoring

During an offering of the outgoing call leg to the called RBT subscriber (e.g., target phone 1320), the user experience for the caller phone 1310 can be enhanced if the custom RBT audio is only played back to the caller phone 1310 in cases where called party (e.g., target phone 1320) is being alerted of the incoming call. In one configuration, when the target phone 1320 is busy or can't be reached, the ring-back tone generator system 1340 provides the caller phone 1310 a standard network tone or announcement indicating the called party's status.

This can be implemented in the ring-back tone generator system 1340 by monitoring the out-of-band SS7 signaling messages received from the signaling network for an indication that the target phone 1320 is alerting or that the call cannot be completed. Based on use of SS7 ISUP, the target phone 1320 can be considered in an alert mode based on receipt of either:

an Address Complete (ACM) message with the called part status indicator (in the backward call indicators parameter) containing the value of "subscriber free"; or a Call Progress (CPG) message with the event indicator containing the value of "alerting".

This triggers the ring-back tone generator system 1340 to start playing the appropriate custom RBT to the caller phone 1310.

Similarly, the ring-back tone generator system 1340 detects when a call cannot be offered to the target phone 1320 based on receipt of either:

an Address Complete (ACM) message containing both the "in-band information available" indicator set in the optional backward call indicators parameter and a cause value parameter indicating an unsuccessful call; or a Call Progress (CPG) message containing both the "in-band information available" value set in the event indicator parameter and a cause value parameter indicating an unsuccessful call.

This causes the incoming and outgoing call legs to be immediately connected within the ring-back tone generator system 1340 switch fabric so that the caller phone 1310 can hear the network provided tone or announcement.

In some networks, existing switching equipment does not or cannot provide the appropriate call progress information using out-of-band SS7 signaling. In these cases, the ring-back tone generator system 1340 monitors the audio channel on the outgoing call leg to detect the appropriate tones (e.g. busy, reorder, ring-back) or announcement, for example using the tone and voice activity detection capability implemented by the DSPs (Digital Signal Processors) on the NMS CG6000 trunk interface board.

The out-of-band and in-band call progress monitoring methods can be employed in parallel by the RBT platform (e.g., ring-back tone generator system 1340). In this case the first positive indication from either method is used to determine the appropriate call treatment—playing of RBT audio or connecting the audio paths for tone or announcement.

Call Forwarding

Prior to a call being answered, the call leg to the called RBT subscriber (B-party) may be forwarded to another subscriber (C-party) or to a voice mail system. At that time it may be beneficial to stop playing custom RBT audio of the B-party and allow the caller (A-party) to hear the RBT audio of the C-party (if also a RBT subscriber) or the normal ring tone provided for the C-party or voice mail system. The ring-back tone generator system 1340 detects the forwarding of a call by receipt of the SS7-ISUP Call Progress (CPG) message with an event information parameter indicating that the call has been forwarded. At this point, the ring-back tone generator system 1340 immediately stops playing the custom RBT audio and connects the incoming and outgoing call legs together within its internal switch fabric to allow the caller phone 1310 to hear a custom RBT associated with C-party.

Redirecting Calls to the RBT Platform

Which method to employ for redirecting the incoming calls to the ring-back tone generator system 1340 depends on the capabilities of equipment in the existing switching network. For each of multiple different vendor types of switching equipment, it may be beneficial to use a different redirecting method for each type of vendor equipment within the same network.

The call redirection may be implemented in such a way that incoming calls to the RBT subscriber from other subscribers on the same network, or from different networks, are routed to the ring-back tone generator system 1340. However, the outbound call leg from the ring-back tone generator system 1340 back to the called subscriber should not be routed back to the ring-back tone generator system 1340 by the switching network in order to avoid an endless loop where the call is never offered to the called subscriber. This prevents a simple call processing feature such as unconditional call forwarding from being used alone for this purpose.

If the existing switching network supports intelligent network (IN) capabilities, one method for redirecting calls to the ring-back tone generator system 1340 is to assign a terminating IN trigger to each custom RBT subscriber. This causes the existing switch to generate a trigger message to a corresponding SCP 1370 on each incoming call for the RBT subscriber and wait for instructions from the SCP 1370 on how to process the call. Depending on the configuration, the SCP 1370 may be part of the existing switching network or may be an integral part of the ring-back tone generator system 1340.

Figure 17:
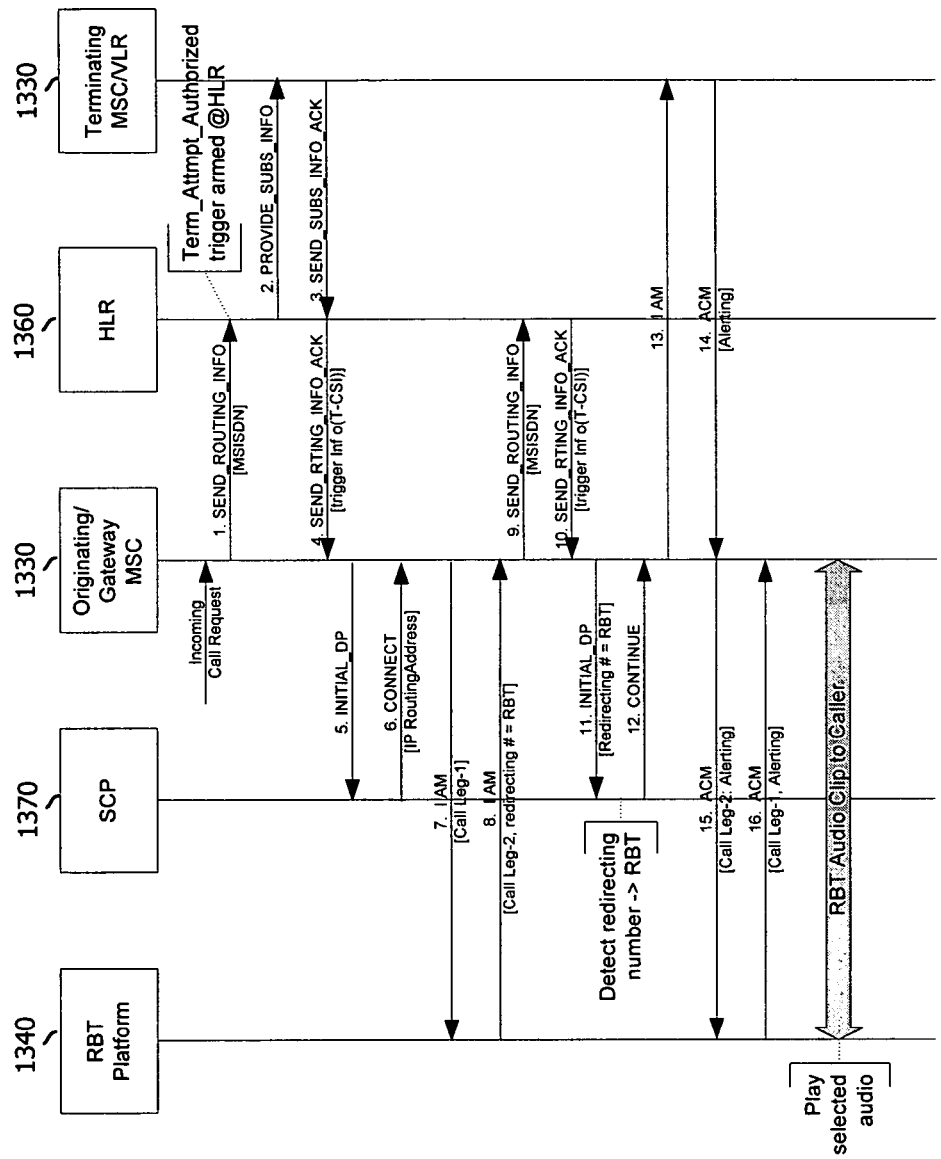
FIG. 17 is an example timing diagram illustrating call handling.

One possible call sequence using the Intelligent Network Application Part (INAP) protocol is shown in FIG. 17. Many other similar sequences are possible depending on the variant of the intelligent network signaling protocol (e.g., INAP, CAMEL, AIN, WIN) supported in the switching network.

Upon receipt of a terminating call trigger from the MSC 1330, the SCP 1370 instructs the MSC 1330 to redirect the call to the ring-back tone generator system 1340, for example, using the INAP Connect message. When the ring-back tone generator system 1340 receives the incoming call and places the outgoing call leg to the called subscriber, the ring-back tone generator system 1340 flags the outgoing call as having already been processed by the RBT platform in a way that is visible to the SCP 1370 when the new call leg again triggers the SCP 1370. Having identified the call as the 2nd leg of a custom RBT call from the ring-back tone generator system 1340, the SCP 1370 can then instruct the MSC 1330 to continue with normal call routing, rather than redirecting the call to the ring-back tone generator system 1340.

One possible mechanism for flagging the call as the 2nd leg of a custom RBT call is for the ring-back tone generator system 1340 to set the "redirecting number" parameter in the outgoing SS7-ISUP initial address message to a number uniquely assigned to the ring-back tone generator system 1340. The SCP 1370 can then test the redirecting number field in the corresponding trigger event (e.g., INAP INITIAL_DP event) for this unique number.

A standard call redirection feature such as call forwarding unconditional (CFU) can be used as an alternate method of redirecting calls for a ring-back tone generator system 1340 that doesn't require an SCP or IN-capable switch. This method provides each RBT subscriber with two associated directory numbers—a public directory number with unconditional call forwarding activated to forward all incoming calls to the ring-back tone generator system 1340, and a private DN that the ring-back tone generator system 1340 uses to terminate calls to the subscriber without getting caught in an infinite loop as discussed. Any other terminating features (e.g., call waiting, call forwarding—no answer for voice mail, etc.) are activated on the private DN and are only applied by the MSC on the 2nd call leg. In one configuration, the private DN is a permutation of the public DN—which is generated by replacing a prefix with an alternate routing prefix reserved for RBT subscribers. The ring-back tone generator system 1340 can maintain a database of directory number mappings and perform a lookup and replace strategy on each received call.

Figure 18:
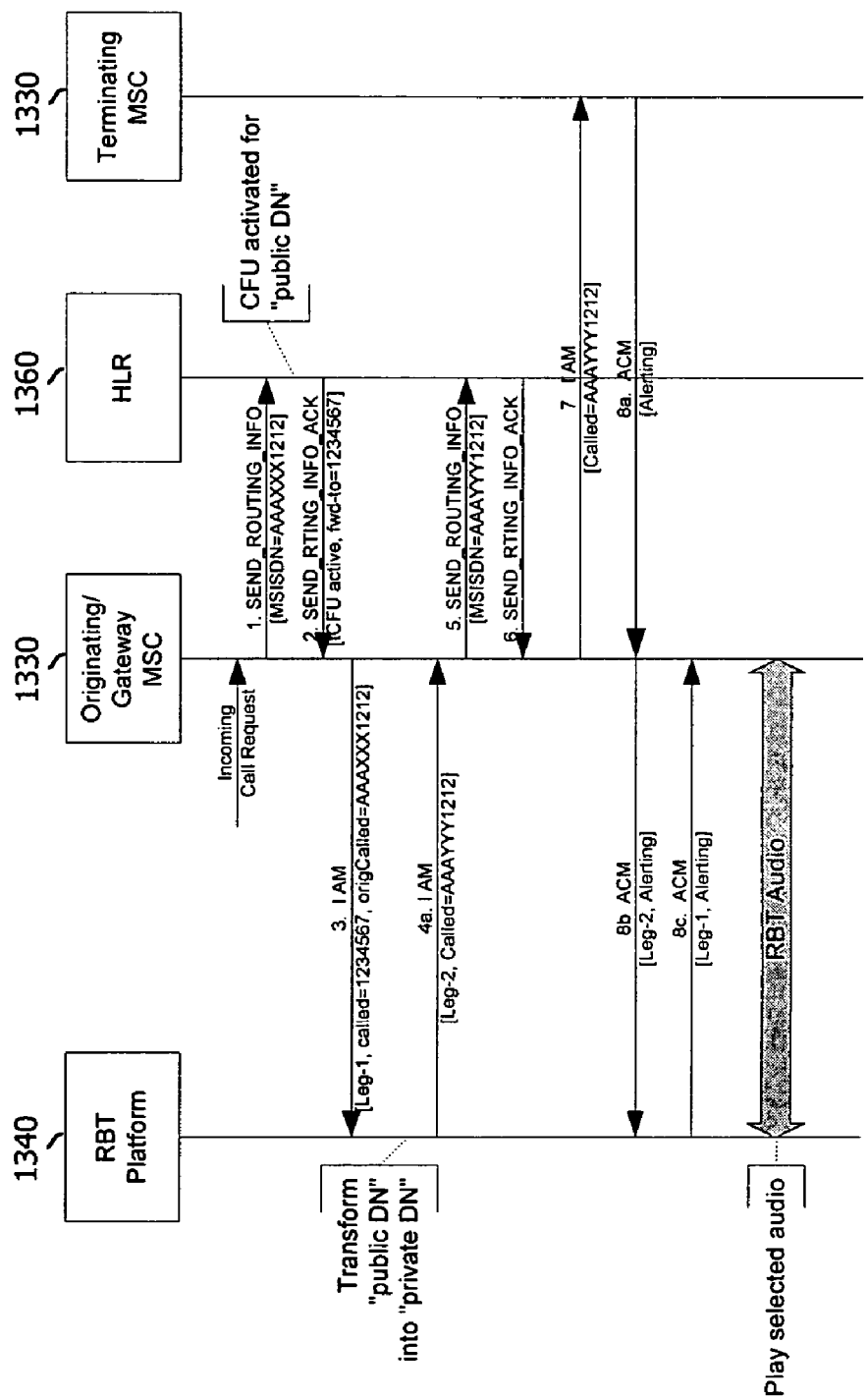
FIG. 18 is an example timing diagram illustrating call handling.

FIG. 18 is a timing diagram illustrating a call flow for the call diversion scenario using CFU and multiple DNs for a GSM-based network. A brief description of the sequence follows below:

Steps Functional Description 1-2 Upon receipt of an incoming call for the RBT subscriber's public DN, the [gateway] MSC 1330 performs its normal SendRoutingInfo request to the HLR 1360. The HLR 1360 returns routing info indicating the CFU is active and the forward-to DN is a number assigned to the ring-back tone generator system 1340.

3 The MSC 1330 forwards the call to the ring-back tone generator system 1340. The subscriber's public DN is included in the "original called number" field of the IAM from the MSC 1330 to the ring-back tone generator system 1340.

4a, 5-6 The ring-back tone generator system 1340 transforms the subscriber's public DN into its private DN and initiates a call back through the MSC 1330 to the target phone 1320 subscriber. Calling party information from the original IAM is retained. The MSC 1330 again queries the HLR 1360 for routing info—this time for the private DN, which is not forwarded to the IP.

7 Upon receipt of routing information from the HLR 1360 for the private DN, the MSC 1330 routes the call to the target phone 1320 subscriber to the visited MSC 8a-c Upon receipt of the ACM from the 2nd call leg indicating that the target phone 1320 subscriber is alerting, the IP returns the ACM for the 1st call leg and begins playing the custom RBT audio back to the caller phone 1310.

Release Line Trunking

Some existing switching equipment (such as the DMS family of switches from Nortel Networks™) supports a feature called Release Line Trunking (RLT). RLT capability allows an enhanced service platform, such as ring-back tone generator system 1340, having two related calls in progress to request the switch to connect those two calls together and drop the enhanced service platform from the call.

Use of RLT can significantly reduce the voice trunk utilization between an MSC 1330 and ring-back tone generator system 1340 using a service node implementation by allowing the ring-back tone generator system 1340 to drop out of the call (and thus release the switch-to-RBT platform trunks used for that call) once the call is answered by the target phone 1320 subscriber or a tone or announcement is detected that must be connected through to the caller phone 1310. This reduces the number of trunks required on both the switch and the ring-back tone generator system 1340 to support a given subscriber base, reducing the cost of deploying the custom RBT service.

Figure 19:
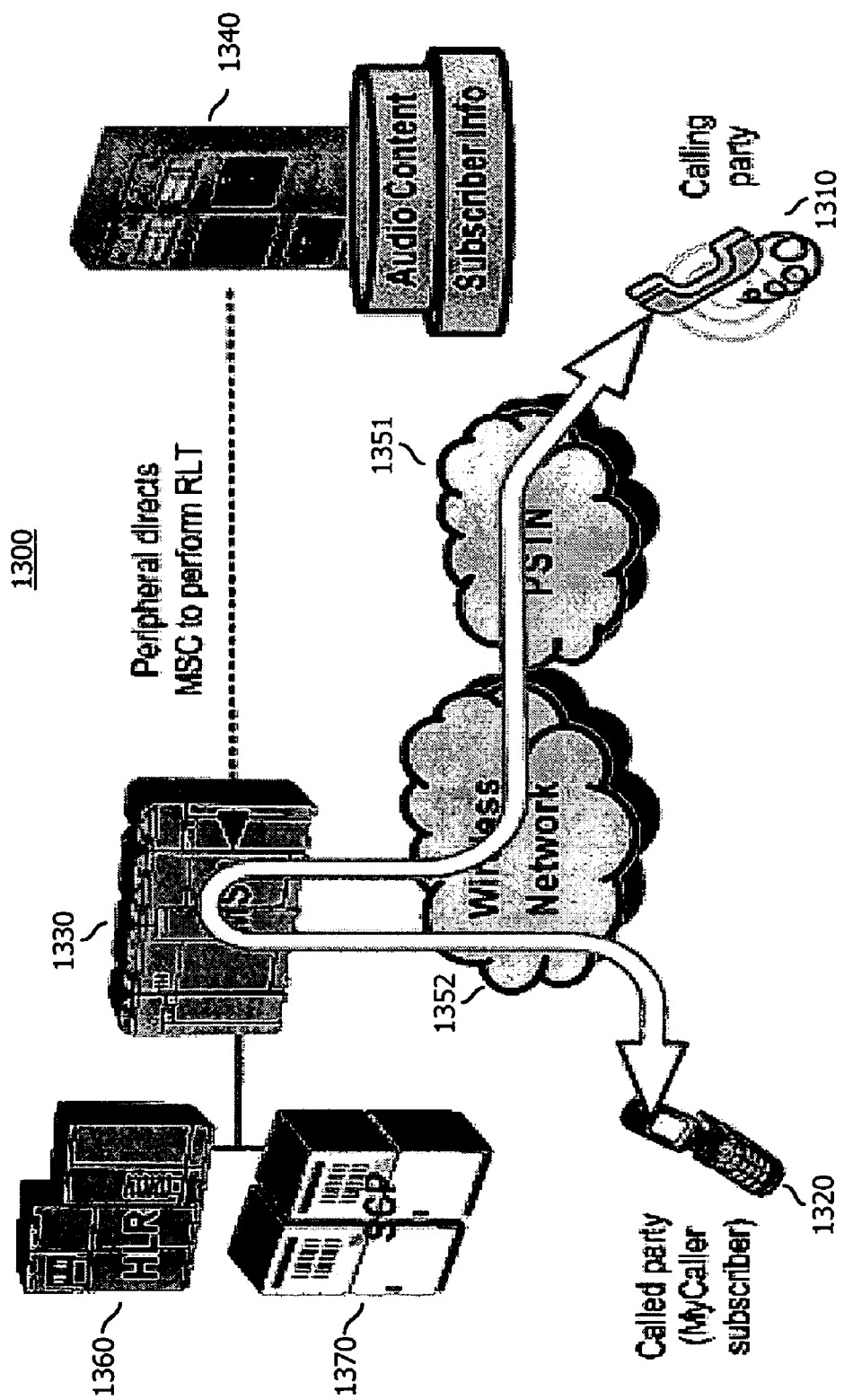
FIG. 19 is a diagram illustrating release line trunking.

The equipment employed and the initial call setup is the same as the normal service node implementation. Once the ring-back tone generator system 1340 detects the call is answered (or a network tone or announcement is detected), the ring-back tone generator system 1340 requests an adjacent switch to bridge the two call legs together rather than in the ring-back tone generator system 1340 in FIG. 19. If the MSC 1330 can satisfy this request, the MSC 1330 connects the specified call legs together within its internal switch fabric and releases the two trunk circuits of the ring-back tone generator system 1340. If the MSC 1330 can't satisfy the RLT request, for example due to blocking in its internal switch fabric or other internal resource failure, the ring-back tone generator system 1340 then connects the calls internally with its own switch fabric and remain in the call path for the duration of the call.

Some switch implementations only allow RLT after the outbound call leg toward the RBT subscriber is answered, but not during a network tone or announcement. In this case, the ring-back tone generator system 1340 uses its internal switch fabric to connect the calls together once a network tone or announcement is detected. This does not significantly affect the trunk utilization since the percentage of calls terminating to tone or announcement is typically low and the duration of those calls is usually short.

Figure 20:
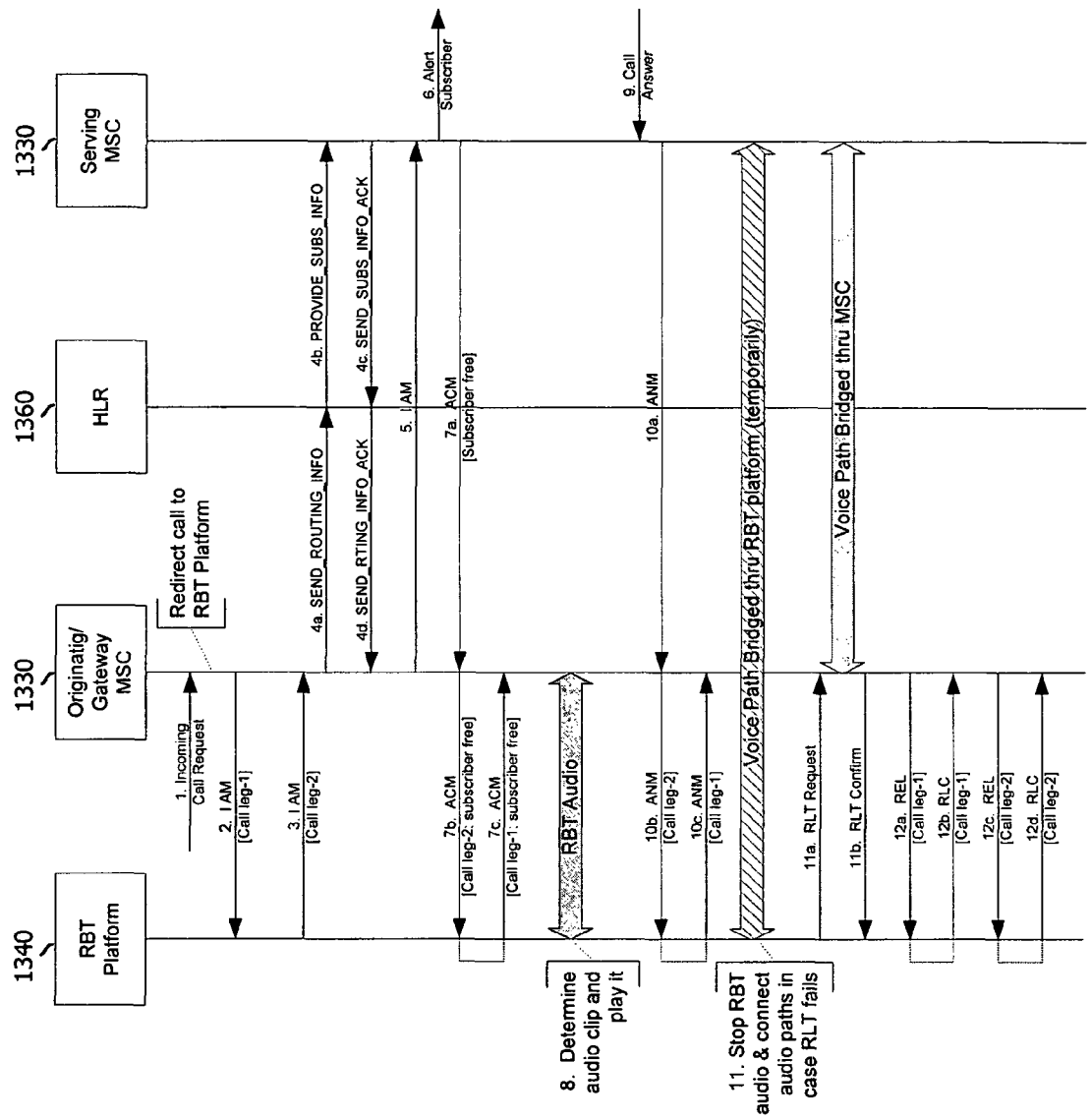
FIG. 20 is an example timing diagram illustrating call handling.

FIG. 20 is a timing diagram illustrating an example RLT implementation using the SS7 ISUP signaling protocol. The exact message sequence used to request RLT and the detailed parameters used to identify the calls to be connected are typically proprietary to each switch vendor and are represented here by generic RLT request and response messages.

The above configurations enable a network operator to deploy a custom ring-back tone service without having to purchase costly customized software or feature upgrade packages for an MSC. For example, an MSC that normally handles call processing to provide a custom ring-back tone service offloads the task to a remote ring-back tone generator system that instead handles call processing and provides the custom ring-back tone service.

While techniques herein have been particularly shown and described with references to preferred configurations thereof, it will be understood by those skilled in the art that various changes in form and details may be made therein without departing from the spirit and scope of the invention as defined by the appended claims. Such variations are intended to be covered by the scope of this invention. As such, the foregoing description of configurations is not intended to be limiting. Rather, any limitations to configurations are presented in the following claims.

What is claimed is:

1. A method of providing a customized ring-back tone in a ring-back generator system, the method comprising:
   receiving an inbound call connection request forwarded from a phone switch that receives the inbound call connection request from a caller phone attempting to connect to a target phone;
   initiating generation of a first call connection on which to provide the customized ring-back tone to the caller phone;
   transmitting an outbound call connection request to the phone switch to establish a second call connection through the phone switch to the target phone;
   receiving an indication from the phone switch that the target phone is being alerted of an attempt by the caller phone to connect to the target phone;
   enabling a bridge in the ring-back tone generator system to couple the first call connection and the second call connection, the bridge connecting the caller phone to the target phone;
   providing a custom ring-back tone on the first call connection to the caller phone;
   attempting to establish the bridge at the phone switch to couple the first call connection and the second call connection, the bridge at the phone switch for relieving a call processing load from the ring back tone generation system;
   detecting a failure of the bridging attempt by the phone switch; and
   continuing maintaining the bridge provided by the ring-back tone generator.

2. A method as in claim 1 further comprising:
   communicating with the phone switch to establish the second call connection through the phone switch; and
   utilizing the second call connection through the phone switch to alert the target phone of an incoming call from the caller phone.

3. A method as in claim 1 further comprising:
   monitoring out-of-band signaling messages associated with the second call connection to identify whether the target phone is being alerted of an attempt by the caller phone to connect to the target phone; and
   while the target phone is being alerted, providing a custom ring-back tone from the ring-back tone generator system over the first call connection to the caller phone.

4. A method as in claim 1 further comprising:
   monitoring out-of-band signaling messages associated with the second call connection to detect termination of a mode of alerting the target phone of an attempt by the caller phone to connect to the target phone.

5. A method as in claim 1 further comprising:
   monitoring in-band audio signals on the second call connection between the ring-back tone generator system and the target phone to determine whether or not to provide a custom ring-back tone to the caller phone in lieu of a standard ring-back tone.

6. A method as in claim 5, wherein providing the custom ring-back tone includes generating one of multiple ring-back tones onto the first call connection depending on an identifier of the caller phone attempting to connect to the target phone.

7. A method as in claim 1 further comprising:
   simultaneously monitoring out-of-band signaling messages associated with the second call connection and in-band audio signals on the second call connection to identify whether the target phone is being alerted of an attempt by the caller phone to connect to the target phone; and
   while the target phone is being alerted, providing a custom ring-back tone from the ring-back tone generator system over the first call connection to the caller phone.

8. A method as in claim 1 further comprising:
   monitoring for a trigger condition indicating that the target phone is no longer being alerted of an attempt by the caller phone to connect to the target phone; and
   in response to detecting the trigger condition, providing a bridge between the first call connection and the second call connection to connect the caller phone to the target phone.

9. A method as in claim 1 further comprising:
   monitoring for a trigger condition indicating a forwarding of the second call connection to an alternative destination instead of the target phone;
   in response to detecting the trigger condition, providing a bridge at the ring-back tone generator system between the caller phone and the alternative destination.

10. A method as in claim 9 further comprising:
    in response to detecting the trigger condition, providing a custom ring-back tone associated with the alternative destination over the first call connection to the caller phone.

11. A method as in claim 1 further comprising:
    providing a flag associated with the outbound call connection request from the ring-back tone generator to differentiate the outbound call connection request from the inbound call connection request.

12. A method as in claim 1 further comprising:
    transmitting a message from the ring-back tone generator system to the phone switch to initiate establishing a bridge at the phone switch between the caller phone and the target phone in lieu of coupling the caller phone to the target phone at the ring-back tone generator system.

13. A method as in claim 12 further comprising:
    receiving notification from the ring-back tone generator system of an inability of the phone switch to provide the bridge between the caller phone and the target phone in lieu of coupling the caller phone to the target phone at the ring-back tone generator system.

14. A method as in claim 13 further comprising:
    in response to receiving the notification, providing a bridge in the ring-back tone generator system between the first call connection and the second call connection to connect the caller phone to the target phone.

15. A method as in claim 1 further comprising:
    initially providing a bridge in the ring-back tone generator system to couple the caller phone to the target phone by connecting the first call connection and the second call connection and, thereafter, transmitting a message from the ring-back tone generator system to the phone switch to initiate establishing a bridge at the phone switch to connect the caller phone and the target phone in lieu of the bridge in the ring-back tone generator system.

16. A method as in claim 1 further comprising:
maintaining the first call connection to include a first trunk of the ring-back tone generator system; and
maintaining the second call connection to include a second trunk of the ring-back tone generator system.

17. A method as in claim 1 further comprising:
in response to monitoring the second call connection and detecting presence of an audio signal on the second call connection, providing a bridge between the first call connection and the second call connection.

18. A method as in claim 1 further comprising:
while providing a custom ring-back tone to the caller phone over the first call connection, monitoring the first call connection for audio signals generated by a user of the caller phone; and
in response to detecting a presence of a particular audio signal based on voice recognition, initiating a corresponding phone function associated with the particular audio signal.

19. A method as in claim 1 further comprising:
over the first call connection, providing one of multiple custom ring-back tones to the caller phone depending on an identifier associated with the caller phone.

20. A method as in claim 1 further comprising:
in addition to providing a customized audio ring-back tone to the caller phone, providing a customized video image to the caller phone.

21. A method as in claim 1 further comprising:
receiving an indication from the phone switch that the target phone cannot be alerted of an attempt by the caller phone to connect to the target phone and, in response, providing a standard ring-back tone on the first call connection to the caller phone in lieu of providing a custom ring-back tone to the caller phone.

22. A method for providing customized ring-back tones in a phone system as in claim 1, the method comprising:
receiving a call connection request originating from a caller phone to establish a call connection between the caller phone and a target phone;
redirecting the call connection request originating from the caller phone to a ring-back tone generator system that provides a customized ring-back tone service;
receiving an indication from a phone switch that the target phone is being alerted of an attempt by the caller phone to connect to the target phone;
enabling a bridge in the ring-back tone generator system to couple the call connection request and the target phone, the bridge connecting the caller phone to the target phone;
providing a custom ring-back tone to the caller phone; and
after redirecting the call connection request, receiving a call connection request from the ring-back tone generator system to establish a call connection between the ring-back tone generator system and the target phone.

23. A method as in claim 22 further comprising:
maintaining at least part of a first communication path between the caller phone and the ring-back tone generator system to convey the customized ring-back tone service from the ring-back tone generator system to the caller phone;
maintaining at least part of a second communication path from the ring-back tone generator system to the target phone, the second communication path having an associated alert transmitted to the target phone indicating an occurrence of the call connection request originating from the user.

24. A method as in claim 23, wherein maintaining at least part of a first communication path includes utilizing a first trunk of a switch in the phone system to form part of the first communication path; and
wherein maintaining at least part of a second communication path includes utilizing a second trunk of the switch to form part of the second communication path.

25. A method as in claim 22 further comprising:
after receiving the call connection request from the ring-back tone generator system, transmitting an alert to the target phone of an attempt by the ring-back tone generator system to establish the call connection between the ring-back tone generator system and the target phone.

26. A method as in claim 22 further comprising:
detecting that the target phone is unable to receive a call alert initiated by the ring-back tone generator system; and
providing notification to the ring-back tone generator system that the target phone is unable to receive the call, the notification prompting the ring-back tone generator system to provide a standard ring-back tone to the caller phone instead of a customized ring-back tone.

27. A method as in claim 22, wherein redirecting the call connection request includes utilizing an unconditional call forwarding message based on a first number identifier associated with the target phone to forward the call connection request to the ring-back tone generator system instead of placing an outgoing call to the target phone.

28. A method as in claim 27, wherein receiving the call connection request from the ring-back tone generator system to establish a call connection between the ring-back tone generator system and the target phone includes receiving a second number identifier associated with the target phone, the second number being used to place a call to the target phone.

29. A method as in claim 22 further comprising:
receiving a flag associated with the call connection request from the ring-back tone generator, the flag providing an indication to perform standard call routing in lieu of redirecting the call connection request from the ring-back tone generator system back to the ring-back tone generator system.

30. A method as in claim 22 further comprising:
notifying the ring-back tone generator system of an inability to provide the bridge between the caller phone and the target phone in lieu of coupling the caller phone to the target phone at the ring-back tone generator system.

31. A method as in claim 22, wherein redirecting the call connection request occurs in response to identifying that the target phone is associated with a subscriber of a custom ring-back tone service.

32. A computer system comprising:
a processor;
a memory unit that stores instructions associated with an application executed by the processor; and
an interconnect coupling the processor and the memory unit, enabling the computer system to execute the application and perform operations of:
receiving an inbound call connection request forwarded from a phone switch that receives the inbound call connection request from a caller phone attempting to connect to a target phone;
initiating generation of a first call connection on which to provide a customized ring-back tone to the caller phone;
transmitting an outbound call connection request to the phone switch to establish a second call connection through the phone switch to the target phone;

receiving an indication from the phone switch that the target phone is being alerted of an attempt by the caller phone to connect to the target phone;

enabling a bridge in a ring-back tone generator system to couple the first call connection and the second call connection, the bridge connecting the caller phone to the target phone;

providing a custom ring-back tone on the first call connection to the caller phone;

attempting to establish the bridge at the phone switch to couple the first call connection and the second call connection, the bridge at the phone switch for relieving a call processing load from the ring back tone generation system;

detecting a failure of the bridging attempt by the phone switch; and continuing maintaining the bridge provided by the ring-back tone generator.

33. A computer system as in claim 32 further supporting operations of:

communicating with the phone switch to establish the second call connection through the phone switch; and utilizing the second call connection through the phone switch to alert the target phone of an incoming call from the caller phone.

34. A computer system as in claim 32 further supporting operations of:

monitoring out-of-band signaling messages associated with the second call connection to identify whether the target phone is being alerted of an attempt by the caller phone to connect to the target phone; and while the target phone is being alerted, providing a custom ring-back tone from the ring-back tone generator system over the first call connection to the caller phone.

35. A computer system as in claim 32 further supporting operations of:

monitoring out-of-band signaling messages associated with the second call connection to detect termination of a mode of alerting the target phone of an attempt by the caller phone to connect to the target phone.

36. A computer system as in claim 32 further supporting operations of:

monitoring in-band audio signals on the second call connection between the ring-back tone generator system and the target phone to determine whether or not to provide a custom ring-back tone to the caller phone in lieu of a standard ring-back tone.

37. A computer system as in claim 36, wherein providing the custom ring-back tone includes generating one of multiple ring-back tones onto the first call connection depending on an identifier of the caller phone attempting to connect to the target phone.

38. A computer system as in claim 32 further supporting operations of:

simultaneously monitoring out-of-band signaling messages associated with the second call connection and in-band audio signals on the second call connection to identify whether the target phone is being alerted of an attempt by the caller phone to connect to the target phone; and while the target phone is being alerted, providing a custom ring-back tone from the ring-back tone generator system over the first call connection to the caller phone.

39. A computer system as in claim 32 further supporting operations of:

monitoring for a trigger condition indicating that the target phone is no longer being alerted of an attempt by the caller phone to connect to the target phone; and in response to detecting the trigger condition, providing a bridge between the first call connection and the second call connection to connect the caller phone to the target phone.

40. A computer system as in claim 32 further supporting operations of:

monitoring for a trigger condition indicating a forwarding of the second call connection to an alternative destination instead of the target phone;

in response to detecting the trigger condition, providing a bridge at the ring-back tone generator system between the caller phone and the alternative destination.

41. A computer system as in claim 40 further supporting operations of:

in response to detecting the trigger condition, providing a custom ring-back tone associated with the alternative destination over the first call connection to the caller phone.

42. A computer system as in claim 32 further supporting operations of:

providing a flag associated with the outbound call connection request from the ring-back tone generator to differentiate the outbound call connection request from the inbound call connection request.

43. A computer system as in claim 32 further supporting operations of:

transmitting a message from the ring-back tone generator system to the phone switch to initiate establishing a bridge at the phone switch between the caller phone and the target phone in lieu of coupling the caller phone to the target phone at the ring-back tone generator system.

44. A computer system as in claim 43 further supporting operations of:

receiving notification from the ring-back tone generator system of an inability of the phone switch to provide the bridge between the caller phone and the target phone in lieu of coupling the caller phone to the target phone at the ring-back tone generator system.

45. A computer system as in claim 44 further supporting operations of:

in response to receiving the notification, providing a bridge in the ring-back tone generator system between the first call connection and the second call connection to connect the caller phone to the target phone.

46. A computer system as in claim 32 further supporting operations of:

initially providing a bridge in the ring-back tone generator system to couple the caller phone to the target phone by connecting the first call connection and the second call connection and, thereafter, transmitting a message from the ring-back tone generator system to the phone switch to initiate establishing a bridge at the phone switch to connect the caller phone and the target phone in lieu of the bridge in the ring-back tone generator system.

47. A computer system as in claim 32 further supporting operations of:

maintaining the first call connection to include a first trunk of the ring-back tone generator system; and maintaining the second call connection to include a second trunk of the ring-back tone generator system.

48. A computer system as in claim 32 further supporting operations of:

in response to monitoring the second call connection and detecting presence of an audio signal on the second call connection, providing a bridge between the first call connection and the second call connection.

49. A computer system as in claim 32 further supporting operations of:
while providing a custom ring-back tone to the caller phone over the first call connection, monitoring the first call connection for audio signals generated by a user of the caller phone; and
in response to detecting a presence of a particular audio signal based on voice recognition, initiating a corresponding phone function associated with the particular audio signal.

50. A computer system as in claim 32 further supporting operations of:
over the first call connection, providing one of multiple custom ring-back tones to the caller phone depending on an identifier associated with the caller phone.

51. A computer system as in claim 32 further supporting operations of:
in addition to providing a customized audio ring-back tone to the caller phone, providing a customized video image to the caller phone.

52. A computer system as in claim 32 further supporting operations of:
receiving an indication from the phone switch that the target phone cannot be alerted of an attempt by the caller phone to connect to the target phone and, in response, providing a standard ring-back tone on the first call connection to the caller phone in lieu of providing a custom ring-back tone to the caller phone.

53. A computer system as in claim 32 further comprising:
the interconnect further enabling the computer system to execute the application and perform operations of:
receiving a call connection request originating from a caller phone to establish a call connection between the caller phone and a target phone;
redirecting the call connection request originating from the caller phone to a ring-back tone generator system that provides a customized ring-back tone service;
receiving an indication from a phone switch that the target phone is being alerted of an attempt by the caller phone to connect to the target phone;
enabling a bridge in the ring-back tone generator system to couple the call connection request and the target phone, the bridge connecting the caller phone to the target phone;
providing a custom ring-back tone to the caller phone; and
after redirecting the call connection request, receiving a call connection request from the ring-back tone generator system to establish a call connection between the ring-back tone generator system and the target phone.

54. A computer system as in claim 53 further supporting operations of:
maintaining at least part of a first communication path between the caller phone and the ring-back tone generator system to convey the customized ring-back tone service from the ring-back tone generator system to the caller phone;
maintaining at least part of a second communication path from the ring-back tone generator system to the target phone, the second communication path having an associated alert transmitted to the target phone indicating an occurrence of the call connection request originating from the user.

55. A computer system as in claim 54, wherein
communication path includes utilizing a first trunk of a switch in the phone system to form part of the first communication path; and
wherein maintaining at least part of a second communication path includes utilizing a second trunk of the switch to form part of the second communication path.

56. A computer system as in claim 53 further supporting operations of:
after receiving the call connection request from the ring-back tone generator system, transmitting an alert to the target phone of an attempt by the ring-back tone generator system to establish the call connection between the ring-back tone generator system and the target phone.

57. A computer system as in claim 53 further supporting operations of:
detecting that the target phone is unable to receive a call alert initiated by the ring-back tone generator system; and
providing notification to the ring-back tone generator system that the target phone is unable to receive the call, the notification prompting the ring-back tone generator system to provide a standard ring-back tone to the caller phone instead of a customized ring-back tone.

58. A computer system as in claim 53, wherein redirecting the call connection request includes utilizing an unconditional call forwarding message based on a first number identifier associated with the target phone to forward the call connection request to the ring-back tone generator system instead of placing an outgoing call to the target phone.

59. A computer system as in claim 58, wherein receiving the call connection request from the ring-back tone generator system to establish a call connection between the ring-back tone generator system and the target phone includes receiving a second number identifier associated with the target phone, the second number being used to place a call to the target phone.

60. A computer system as in claim 53 further supporting operations of:
receiving a flag associated with the call connection request from the ring-back tone generator, the flag providing an indication to perform standard call routing in lieu of redirecting the call connection request from the ring-back tone generator system back to the ring-back tone generator system.

61. A computer system as in claim 53 further supporting operations of:
notifying the ring-back tone generator system of an inability to provide the bridge between the caller phone and the target phone in lieu of coupling the caller phone to the target phone at the ring-back tone generator system.

62. A computer system as in claim 53, wherein redirecting the call connection request occurs in response to identifying that the target phone is associated with a subscriber of a custom ring-back tone service.

63. A method for supporting customized ring-back tones in a phone system as in claim 1, the method comprising:
receiving a call connection request originating from a caller phone to establish a call connection between the caller phone and a target phone;
receiving an indication from a phone switch that the target phone is being alerted of an attempt by the caller phone to connect to the target phone;
enabling a bridge in the ring-back tone generator system to couple the call connection request, and the target phone, the bridge connecting the caller phone to the target phone;

the bridge for providing that, in lieu of directly servicing the call connection request by connecting the caller phone to the target phone at the phone switch in the phone system, transferring control over the call connection request from the phone system to a service control point in communication with the switch via a network connection; and receiving commands from the service control point to provide a custom ring-back tone to the caller phone.

64. A method for providing customized ring-back tones in a phone system as in claim 1, the method comprising:

receiving a call connection request originating from a caller phone to establish a call connection between the caller phone and a target phone;

in lieu of servicing the call connection request in a phone switch capable of directly connecting the caller phone to the target phone, redirecting the call connection request originating from the caller phone to a ring-back tone generator system that provides a customized ring-back tone service; and after redirecting the call connection request, receiving a call connection request from the ring-back tone generator system initiating establishment of a call connection through a trunk of the ring-back tone generator system to the target phone.

65. A method for providing customized ring-back tones in a phone system, the method comprising:

receiving a call connection request originating from a caller phone to establish a link between the caller phone and a target phone identified in the call connection request;

receiving an indication from a phone switch that the target phone is being alerted of an attempt by the caller phone to connect to the target phone;

identifying that the target phone is associated with a subscriber of a custom ring-back tone service;

in response to the identifying, through a first trunk of the phone system, forwarding the call connection request originating from the caller phone to a custom ring-back tone generator that generates a customized ring-back tone in lieu of a standard ring-back tone to the caller phone, the custom ring-back tone generator providing the customized ring-back tone to the caller phone over a first call connection between the custom ring-back tone generator and the caller phone;

after forwarding the call connection request originating from the caller phone to the custom ring-back tone generator, through a second trunk of the phone system, receiving a call connection request from the custom ring-back tone generator to establish a second call connection, independent of the first call connection, between the custom ring-back tone generator and the target phone;

enabling a bridge in the custom ring-back tone generator to couple the first call connection and the second call connection, the bridge connecting the caller phone to the target phone;

providing customized audio over the first call connection and the second call connection during an active session including communications between a user of the caller phone and a user of the target phone;

attempting to establish the bridge at the phone switch to couple the first call connection and the second call connection, the bridge at the phone switch for relieving a call processing load from the ring back tone generation system;

detecting a failure of the bridging attempt by the phone switch; and continuing maintaining the bridge provided by the ringback tone generator.

66. A computer system associated with a storage area network, the computer system providing:

means for receiving an inbound call connection request forwarded from a phone switch that receives the inbound call connection request from a caller phone attempting to connect to a target phone;

means for initiating generation of a first call connection on which to provide a customized ring-back tone to the caller phone;

means for transmitting an outbound call connection request to the phone switch to establish a second call connection through the phone switch to the target phone;

means for receiving an indication from the phone switch that the target phone is being alerted of an attempt by the caller phone to connect to the target phone;

means for enabling a bridge in a ring-back tone generator system to couple the first call connection and the second call connection, the bridge connecting the caller phone to the target phone; and means for providing customized audio over the first call connection and the second call connection during an active session including communications between a user of the caller phone and a user of the target phone;

means for providing a custom ring-back tone on the first call connection to the caller phone;

means for attempting to establish the bridge at the phone switch to couple the first call connection and the second call connection, the bridge at the phone switch for relieving a call processing load from the ring back tone generation system;

means for detecting a failure of the bridging attempt by the phone switch; and means for continuing maintaining the bridge provided by the ringback tone generator.

67. A computer program product including a computer-readable storage medium having instructions stored thereon for processing data information, such that the instructions, when carried out by a processing device, enable the processing device to perform the steps of:

receiving an inbound call connection request forwarded from a phone switch that receives the inbound call connection request from a caller phone attempting to connect to a target phone;

initiating generation of a first call connection on which to provide a customized ring-back tone to the caller phone;

transmitting an outbound call connection request to the phone switch to establish a second call connection through the phone switch to the target phone;

receiving an indication from the phone switch that the target phone is being alerted of an attempt by the caller phone to connect to the target phone;

enabling a bridge in a ring-back tone generator system to couple the first call connection and the second call connection, the bridge connecting the caller phone to the target phone;

providing a custom ring-back tone on the first call connection to the caller phone;

attempting to establish the bridge at the phone switch to couple the first call connection and the second call connection, the bridge at the phone switch for relieving a call processing load from the ring back tone generation system;

detecting a failure of the bridging attempt by the phone switch; and continuing maintaining the bridge provided by the ringback tone generator.

68. The method of claim 1 further comprising:

identifying that the target phone is associated with a subscriber of a custom ring-back tone service; and monitoring in-band audio signals on the second call connection between the ring-back tone generator system and the target phone to determine whether or not to provide a custom ring-back tone to the caller phone in lieu of a standard ring-back tone.

69. The method of claim 1 further comprising, upon establishment of the bridge at the phone switch, transferring the connection from the bridge at the ringback tone generation system to the bridge at the phone switch; and maintaining the connection established by the bridge through either the ringback controller of the switching center.

70. The method of claim 1 wherein enabling a bridge further comprises bridging at the ring back tone generator, further including:

selectively providing, at either the ringback controller or the phone switch, a bridge; and upon detection of the subscriber answering the phone, maintaining the connection established by the bridge through either the ringback controller of the switching center.

* * * * *